(12) United States Patent
Barrington et al.

(10) Patent No.: US 12,154,061 B2
(45) Date of Patent: *Nov. 26, 2024

(54) METHODS AND SYSTEMS FOR REQUESTING AND DISPLAYING UAV INFORMATION

(71) Applicant: Wing Aviation LLC, Mountain View, CA (US)

(72) Inventors: Luke Barrington, Mountain View, CA (US); Jonathan Lesser, Mountain View, CA (US)

(73) Assignee: Wing Aviation LLC, Palo Alto, CA (US)

(*) Notice: Subject to any disclaimer, the term of this patent is extended or adjusted under 35 U.S.C. 154(b) by 348 days.

This patent is subject to a terminal disclaimer.

(21) Appl. No.: 17/515,518

(22) Filed: Oct. 31, 2021

(65) Prior Publication Data
US 2022/0050472 A1 Feb. 17, 2022

Related U.S. Application Data

(63) Continuation of application No. 16/158,722, filed on Oct. 12, 2018, now Pat. No. 11,493,930, which is a
(Continued)

(51) Int. Cl.
*G06Q 10/083* (2024.01)
*B64C 39/02* (2023.01)
(Continued)

(52) U.S. Cl.
CPC ......... *G06Q 10/083* (2013.01); *B64C 39/024* (2013.01); *B64D 1/22* (2013.01);
(Continued)

(58) Field of Classification Search
CPC ...... G06Q 10/083; G06Q 50/28; G06F 16/29; B64C 39/024; B64D 1/22; G01C 21/32;
(Continued)

(56) References Cited

U.S. PATENT DOCUMENTS 9,063,544 B2 6/2015 Vian
9,305,280 B1 4/2016 Berg et al.
(Continued)

FOREIGN PATENT DOCUMENTS

CN 106062783 10/2016
KR 1020170014817 2/2017
(Continued)

OTHER PUBLICATIONS

International Searching Authority, International Search Report and Written Opinion mailed on Jul. 31, 2018, issued in connection with International Patent Application No. PCT/US2018/029887, filed on Apr. 27, 2018, 18 pages.

*Primary Examiner* — Mahmoud S Ismail
*Assistant Examiner* — Gabriel Anfinrud
(74) *Attorney, Agent, or Firm* — McDonnell Boehnen Hulbert & Berghoff LLP

(57) ABSTRACT

Described herein are methods and systems that help facilitate the summoning and loading of a pickup and delivery unmanned aerial vehicle (UAV). In particular, a computing system may display a graphical interface including an interface feature that indicates UAV assignments. That computing system may receive a message including a UAV identifier that identifies a particular UAV assigned to a particular item based on a UAV-assignment request for the particular item. And the computing system may use the received UAV identifier as a basis for displaying, on the graphical interface, (i) a graphical identifier of the particular UAV assigned to the particular item based on the UAV-assignment request for the particular item and (ii) a graphical identifier of the particular item.

20 Claims, 31 Drawing Sheets

Related U.S. Application Data continuation of application No. 15/588,915, filed on May 8, 2017, now Pat. No. 10,467,578.

(51) Int. Cl.

| | | |
|---|---|---|
| *B64D 1/22* | (2006.01) | |
| *B64U 101/60* | (2023.01) | |
| *G01C 21/32* | (2006.01) | |
| *G05D 1/00* | (2024.01) | |
| *G06F 16/29* | (2019.01) | |
| *G06Q 10/08* | (2024.01) | |

(52) U.S. Cl.
CPC ........... *G01C 21/32* (2013.01); *G05D 1/0027* (2013.01); *G05D 1/0088* (2013.01); *G05D 1/0234* (2013.01); *G06F 16/29* (2019.01); *G06Q 10/08* (2013.01); *B64U 2101/60* (2023.01)

(58) Field of Classification Search
CPC .. G05D 1/0027; G05D 1/0088; G05D 1/0234; G05D 2201/021; B64U 2101/60
See application file for complete search history.

(56) References Cited

U.S. PATENT DOCUMENTS

| | | |
|---|---|---|
| 9,336,506 B2 | 5/2016 | Shucker et al. |
| 9,536,216 B1 | 1/2017 | Lisso |
| 9,626,874 B1 | 4/2017 | Gupta et al. |
| 10,467,578 B2 * | 11/2019 | Barrington ............. G01C 21/32 |
| 2015/0120094 A1 | 4/2015 | Kimchi et al. |
| 2016/0307449 A1 | 10/2016 | Gordon et al. |
| 2017/0011340 A1 | 1/2017 | Gabbai |
| 2017/0064665 A1 * | 3/2017 | Deloach ............... G01C 21/206 |
| 2017/0090484 A1 | 3/2017 | Obaidi |
| 2017/0286892 A1 * | 10/2017 | Studnicka ........... G06Q 20/389 |
| 2017/0313421 A1 | 11/2017 | Gil |
| 2017/0323257 A1 * | 11/2017 | Cheatham, III ... G06Q 10/0832 |
| 2018/0144302 A1 * | 5/2018 | Murray .................. G06V 40/10 |
| 2018/0203465 A1 | 7/2018 | Suzuki |

FOREIGN PATENT DOCUMENTS

| | | |
|---|---|---|
| KR | 1020170030442 | 3/2017 |
| TW | 201704099 | 2/2017 |
| WO | 2016/154947 | 10/2016 |
| WO | 2016/210432 | 12/2016 |

* cited by examiner

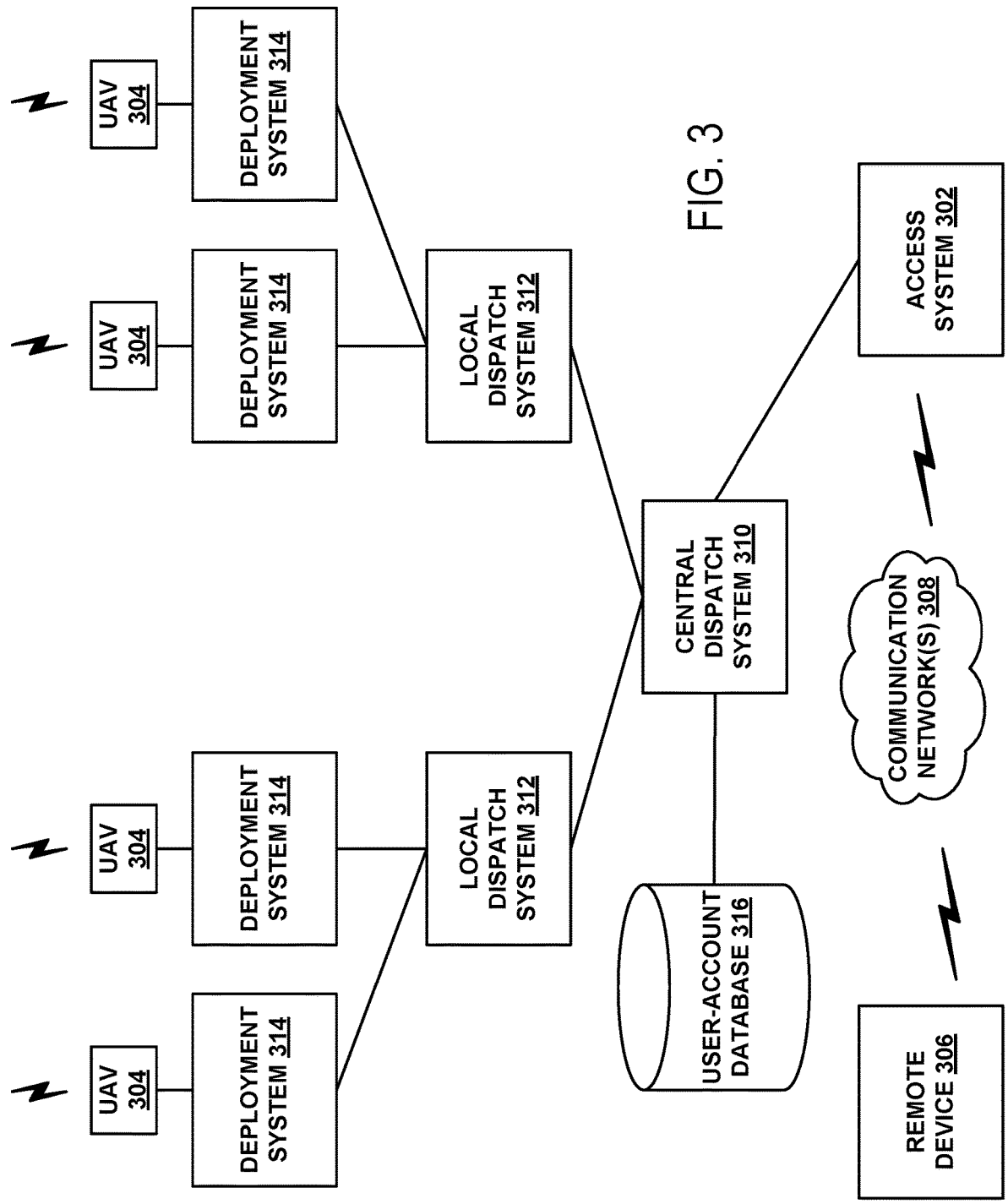

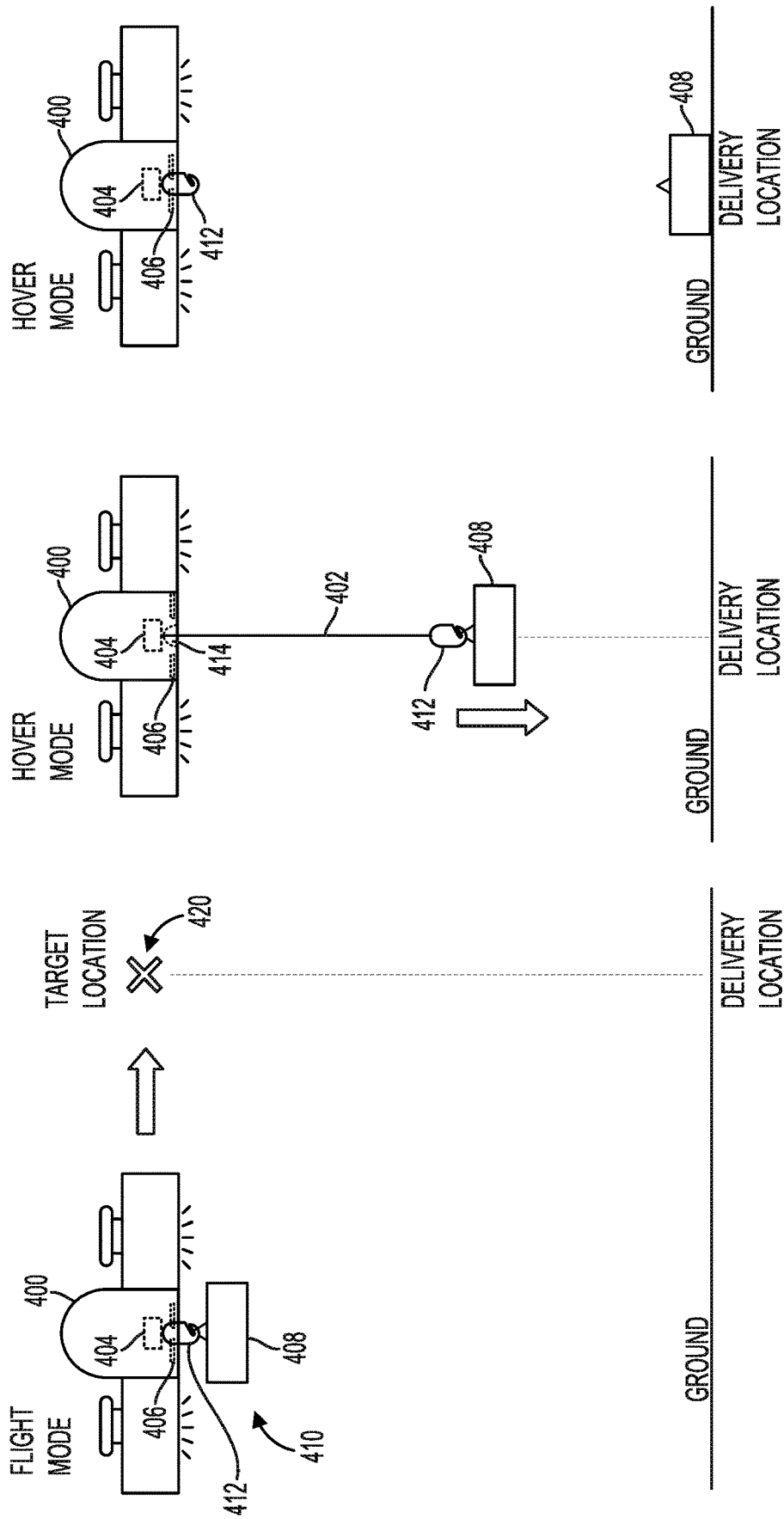

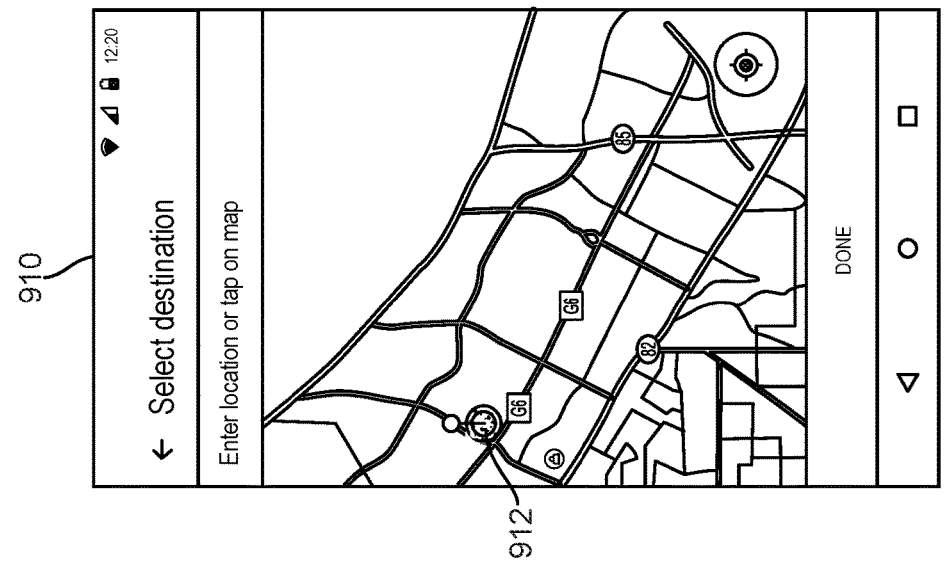
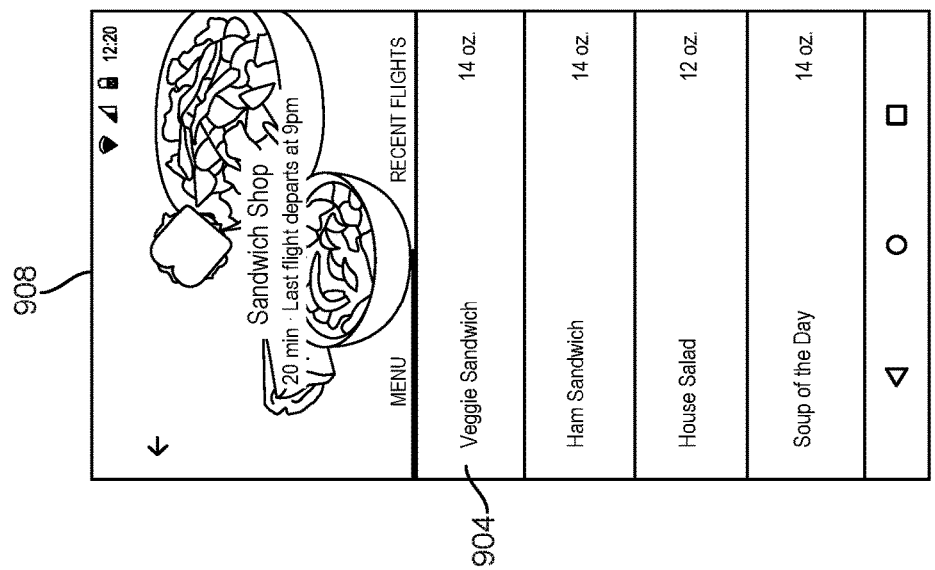
FIG. 9B

METHODS AND SYSTEMS FOR REQUESTING AND DISPLAYING UAV INFORMATION

CROSS REFERENCE TO RELATED APPLICATIONS

The present application is a continuation of U.S. application Ser. No. 16/158,722, filed Oct. 12, 2018, which is a continuation of U.S. application Ser. No. 15/588,915, filed May 8, 2017, which are both herein incorporated by reference in their entirety and for all purposes.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example implementations may relate to a graphical interface that helps facilitate and monitor UAV assignments. In particular, a "sender", such as an individual or a business for instance, may seek to have UAV(s) assigned to respectively pick up various item(s) at a source location for subsequent transport of each item by the respectively assigned UAV to a respective other location. In this situation, the graphical interface could be used to manually request a server to assign a UAV to pick up/transport a particular item and/or the server may automatically facilitate such a UAV assignment without a request being provided via the graphical interface.

In either case, when UAV(s) are assigned, the graphical interface may include interface features to display which UAV is respectively assigned to which item, so that, once a given UAV arrives at a source location, an individual or a business could know which item should be loaded onto that given UAV. Moreover, the graphical interface could also display other information, such as information about a particular UAV's flight status for instance, as well as interface features through which other input may be provided, such input indicating a successful or unsuccessful pickup of the item for instance, among other possibilities.

In one aspect, a method is provided. The method may involve displaying, by a computing system, a graphical interface comprising an interface feature that indicates UAV assignments. The method may also involve receiving, by the computing system, a message comprising a UAV identifier that identifies a particular UAV assigned to a particular item based on a UAV-assignment request for the particular item. The method may further involve using the received UAV identifier as a basis for displaying, on the graphical interface, (i) a graphical identifier of the particular UAV assigned to the particular item based on the UAV-assignment request for the particular item and (ii) a graphical identifier of the particular item.

In another aspect, a computing system is provided. The computing system includes one or more processors, a non-transitory computer readable medium, and program instructions stored on the non-transitory computer readable medium and executable by the one or more processors to perform functions. In particular the program instructions may be executable to display a graphical interface comprising an interface feature that indicates UAV assignments. Also, the program instructions may be executable to receive a message comprising a UAV identifier that identifies a particular UAV assigned to a particular item based on a UAV-assignment request for the particular item. Further, the program instructions may be executable to use the received UAV identifier as a basis for displaying, on the graphical interface, (i) a graphical identifier of the particular UAV assigned to the particular item based on the UAV-assignment request for the particular item and (ii) a graphical identifier of the particular item.

In yet another aspect, a server is provided. The server includes one or more processors, a non-transitory computer readable medium, and program instructions stored on the non-transitory computer readable medium and executable by the one or more processors to perform functions. In particular, the program instructions may be executable to receive a UAV-assignment request for a particular item. Also, the program instructions may be executable to, based on the UAV-assignment request for the particular item, assign a particular UAV to the particular item. Further, the program instructions may be executable to instruct a computing system to display, on a graphical interface comprising an interface feature that indicates UAV assignments, (i) a graphical identifier of the particular UAV assigned to the particular item based on the UAV-assignment request for the particular item and (ii) a graphical identifier of the particular item.

In yet another aspect, a system is provided. The system may include means for displaying a graphical interface comprising an interface feature that indicates UAV assignments. The system may also include means for receiving a message comprising a UAV identifier that identifies a particular UAV assigned to a particular item based on a UAV-assignment request for the particular item. The system may further include means for using the received UAV identifier as a basis for displaying, on the graphical interface, (i) a graphical identifier of the particular UAV assigned to the particular item based on the UAV-assignment request for the particular item and (ii) a graphical identifier of the particular item.

In yet another aspect, another system is provided. The system may include means for receiving a UAV-assignment request for a particular item. The system may also include means for, based on the UAV-assignment request for the particular item, assigning a particular UAV to the particular item. The system may further include means for instructing a computing system to display, on a graphical interface comprising an interface feature that indicates UAV assignments, (i) a graphical identifier of the particular UAV assigned to the particular item based on the UAV-assignment request for the particular item and (ii) a graphical identifier of the particular item.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3 is a simplified block diagram illustrating a UAV system, according to an example implementation.

FIGS. 4A, 4B, and 4C show a payload pickup and delivery apparatus, according to example implementations.

DETAILED DESCRIPTION

Figure 1A:
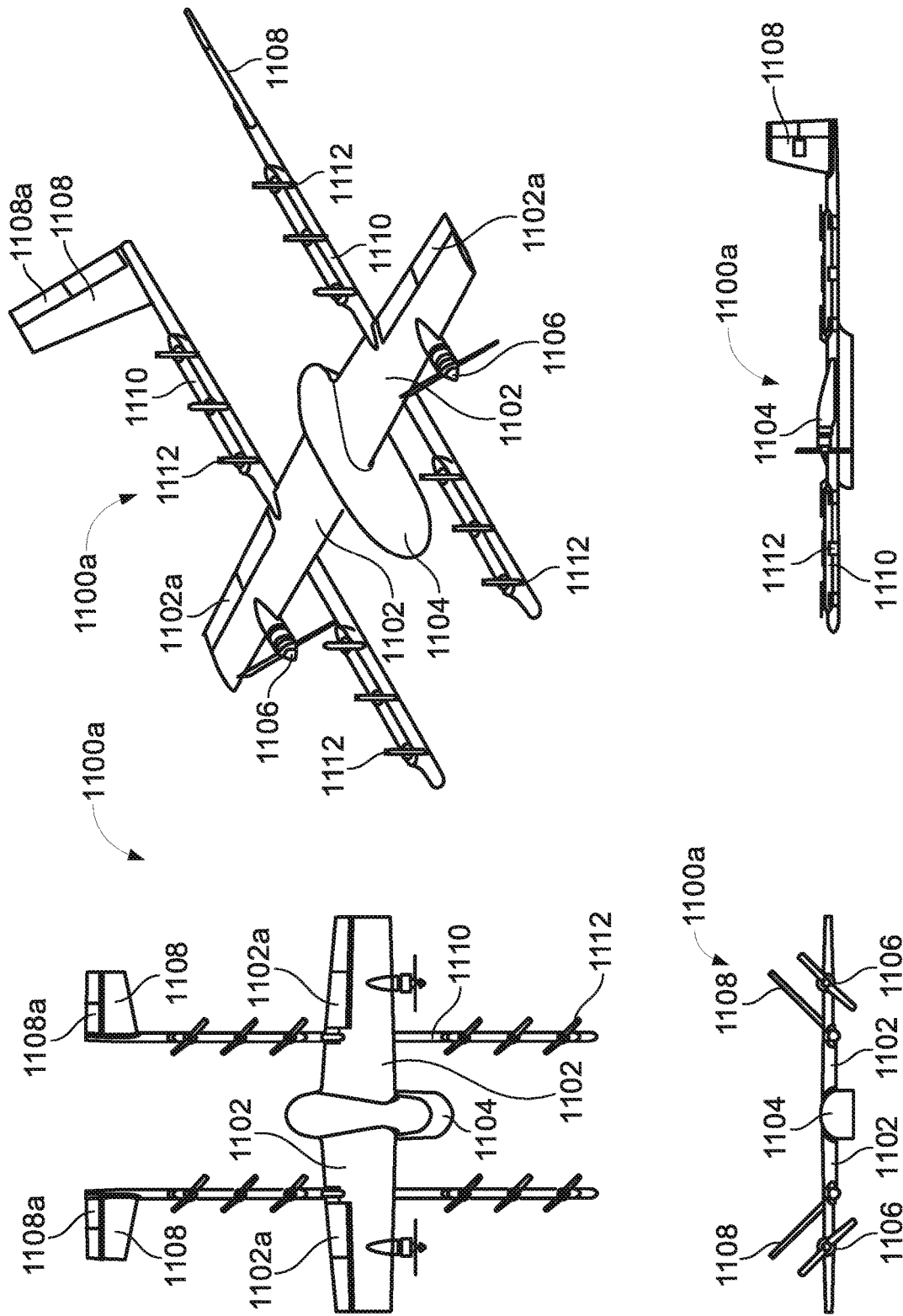
FIG. 1A is a simplified illustration of an unmanned aerial vehicle, according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

Example implementations may relate to an interface that facilitates interactions between a sender that is sourcing item(s) and a server that coordinates assignments of UAV(s) to respectively pick up the item(s) at a source location for subsequent transport of the item(s) to respective other locations. Generally, the sender may be a business (e.g., food vendor) seeking to have a UAV pick up and then transport a particular item (e.g., food delivery) to a customer, among other possibilities. Moreover, the interface may be a graphical interface that could be displayed by a display device of a computing system (e.g., a restaurant's mobile phone or laptop computer). In accordance with the disclosure, the interface may help a sender with submission of UAV-assignment requests and/or may help streamline the process of physically loading item(s) respectively onto the appropriate UAV(s).

More specifically, the server may receive a UAV-assignment request in various ways. For example, the computing system could receive a UAV-assignment request for a particular item, and may then forward/transmit the request to the server, so that the server could facilitate assignment of a particular UAV for the particular item. In this example, the computing system may manually receive the UAV-assignment request via the graphical interface or through other input mechanisms. Alternatively, the computing system may receive a transport request requesting for the particular item to be transported to another location, such as when a customer submits a food delivery request through the customer's mobile phone for instance, and the computing system may then automatically generate the UAV-assignment request based on the received transport request and transmit the generated UAV-assignment request to the server. In yet other examples, the server could directly receive the transport request and then facilitate assignment of a UAV based on that transport request. Other examples are possible as well.

Once the server receives a UAV-assignment request or otherwise determines that a UAV should be assigned to a particular item, the server may then assign a UAV based on factors such as the weight of the item and/or proximity of the UAV to the source location, among other possibilities. For instance, the server may identify and then assign a nearby UAV that is capable to lifting the weight of the item (e.g., in accordance with manufacturer specifications).

After the server assigns the UAV, the computing system may then receive from the server a message specifying the particular UAV that has been assigned to pick up the particular item at the source location for subsequent transport of the item to another location. Generally, the message may include an identifier of the assigned UAV, so that the computing system can ultimately indicate the identifier of the UAV to the sender via the graphical interface. Moreover, the received information may also include a mapping of the identifier of the UAV to an identifier of the item, so that the computing system is able to indicate via the interface that the particular UAV is assigned to the particular item at issue rather than to another item.

Accordingly, based on the received message, the computing system may display on the graphical interface a graphical indication of the UAV that has been assigned to pick up the item. For example, the displayed indication may include a graphical identifier of the item being displayed alongside a graphical identifier of the assigned UAV. And the UAV's identifier could be specified on the assigned UAV in one of various ways, so as to help the sender recognize the assigned UAV when that UAV arrived at the source location to pick up the item at issue, thereby helping the sender distinguish the assigned UAV from other UAV(s) that may have arrived and/or will arrive at the source location. With these arrangements, the interface could thus display indications of various UAVs that have been respectively assigned to pick up various items at the source location, which may help the sender facilitate efficient loading of each item onto the appropriate assigned UAV, so that the UAV could then transport the item to another location (e.g., a customer's location).

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing various views of a UAV, according to an example implementation. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other implementations, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn left or right) during flight. In some implementations, the UAV 1100a may be also configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1110 may be used during a hover mode wherein the UAV 1110a is descending to a delivery location, or ascending following a delivery. In the example UAV 1100a, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

Figure 1B:
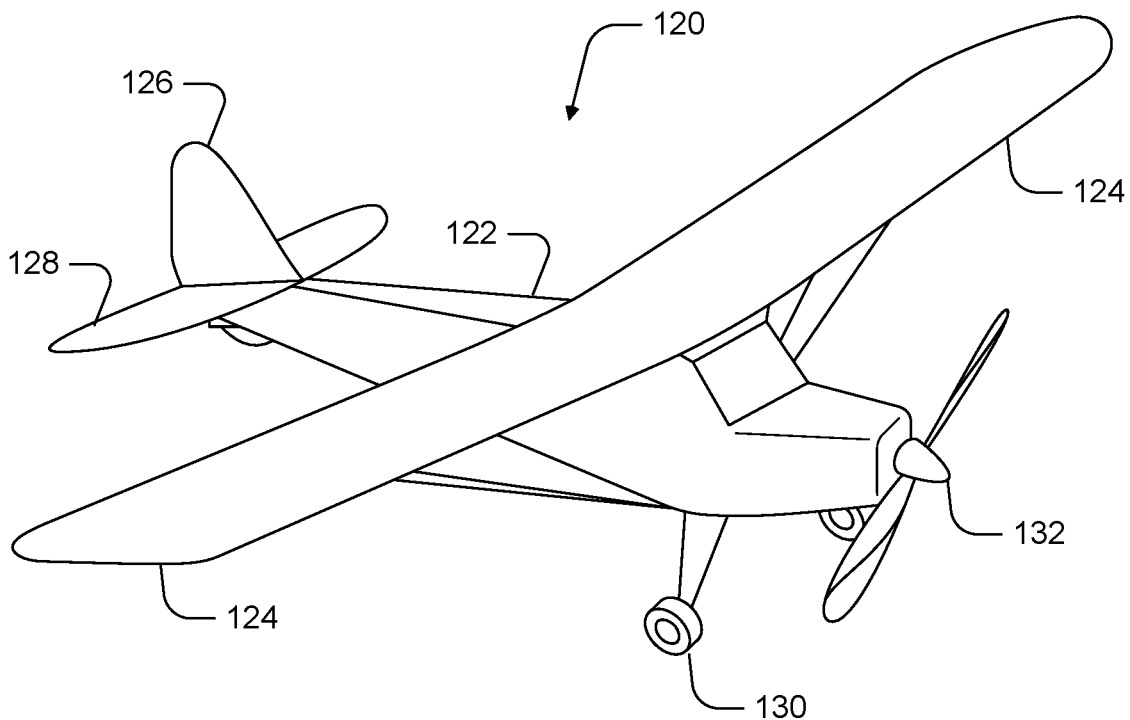
FIG. 1B is a simplified illustration of an unmanned aerial vehicle, according to an example implementation.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
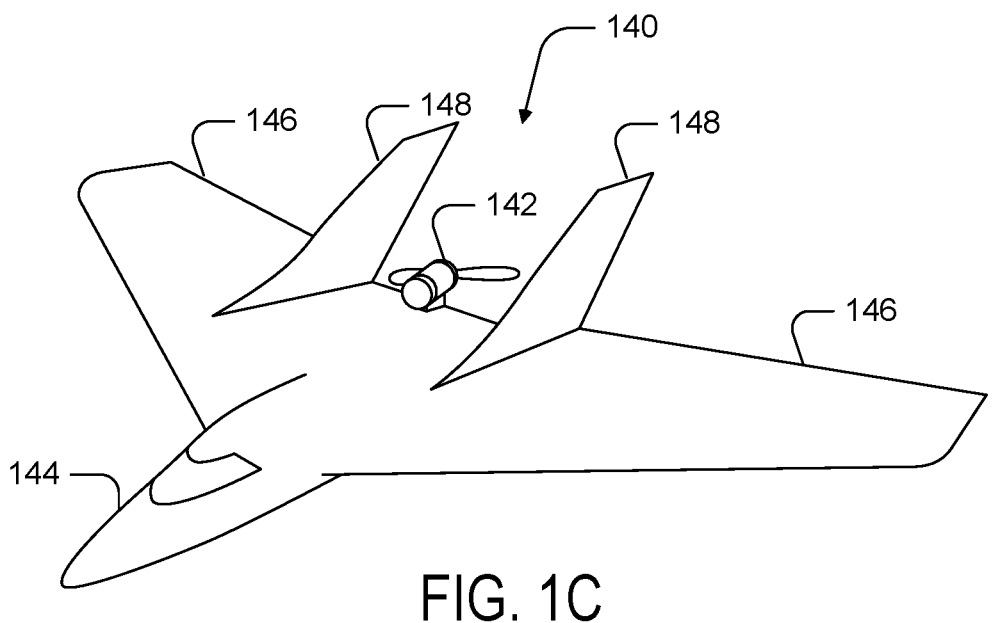
FIG. 1C is a simplified illustration of an unmanned aerial vehicle, according to an example implementation.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
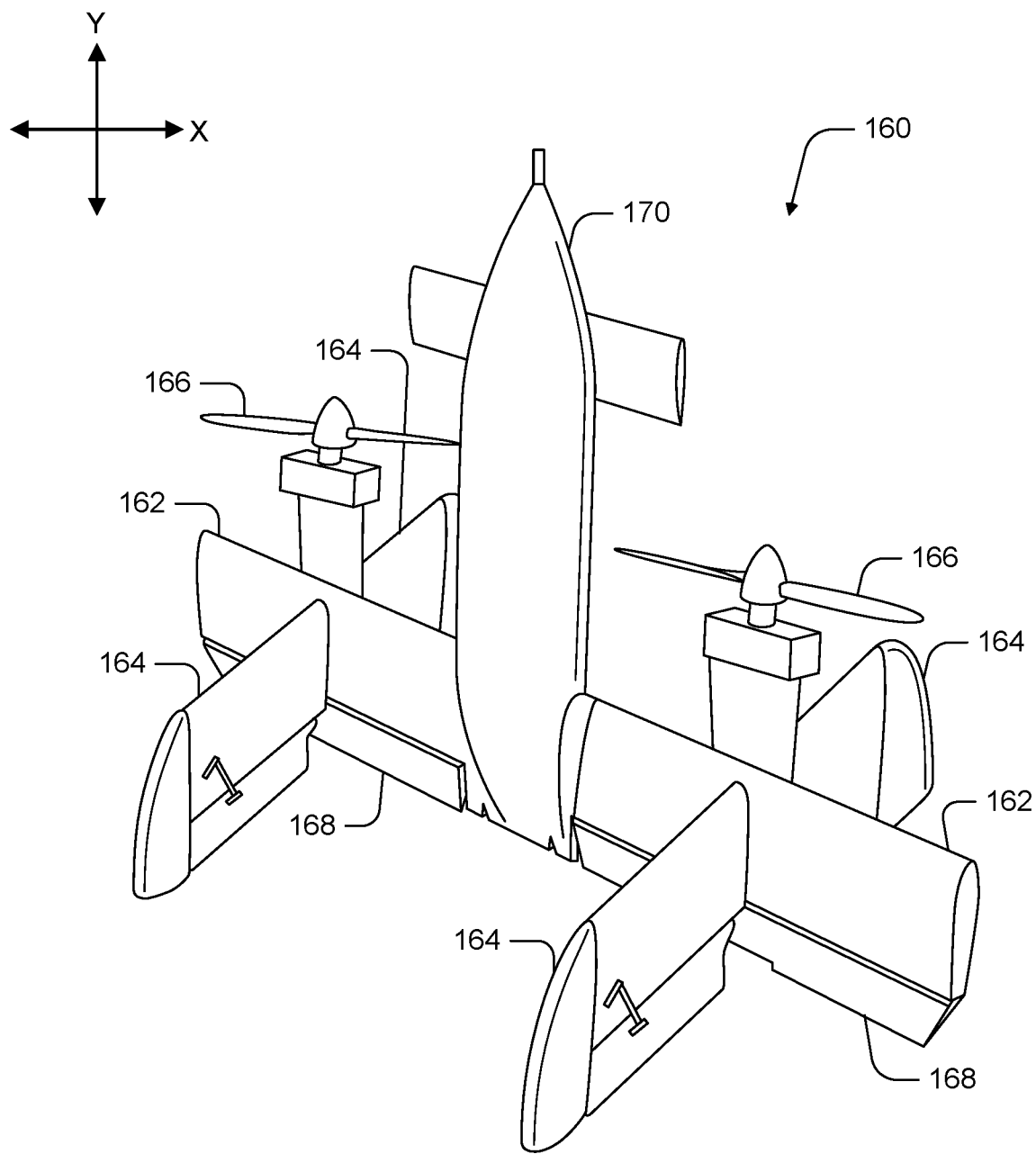
FIG. 1D is a simplified illustration of an unmanned aerial vehicle, according to an example implementation.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
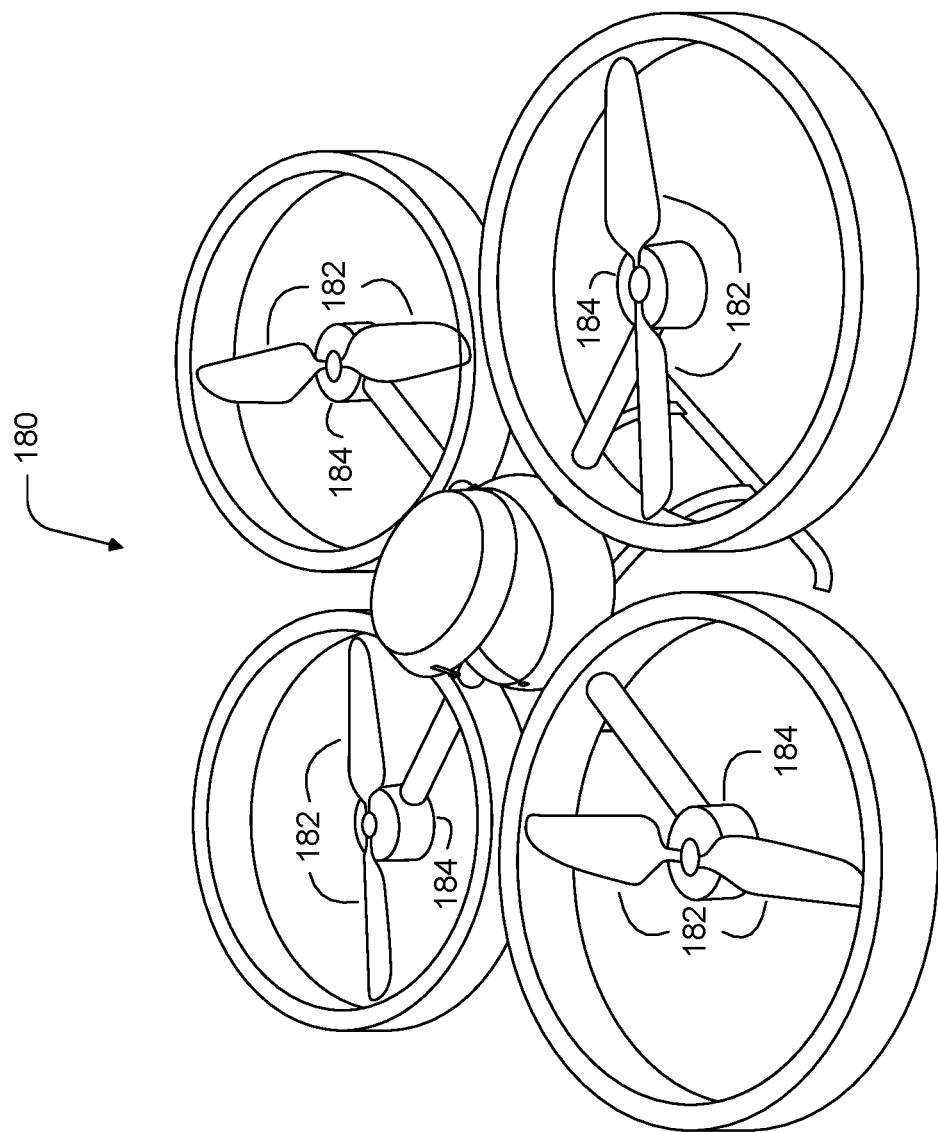
FIG. 1E is a simplified illustration of an unmanned aerial vehicle, according to an example implementation.

As noted above, some implementations may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example implementations may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some implementations, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example implementations may relate to, be implemented within, or take the form of any type of unmanned aerial vehicle.

III. Illustrative UAV Components

Figure 2:
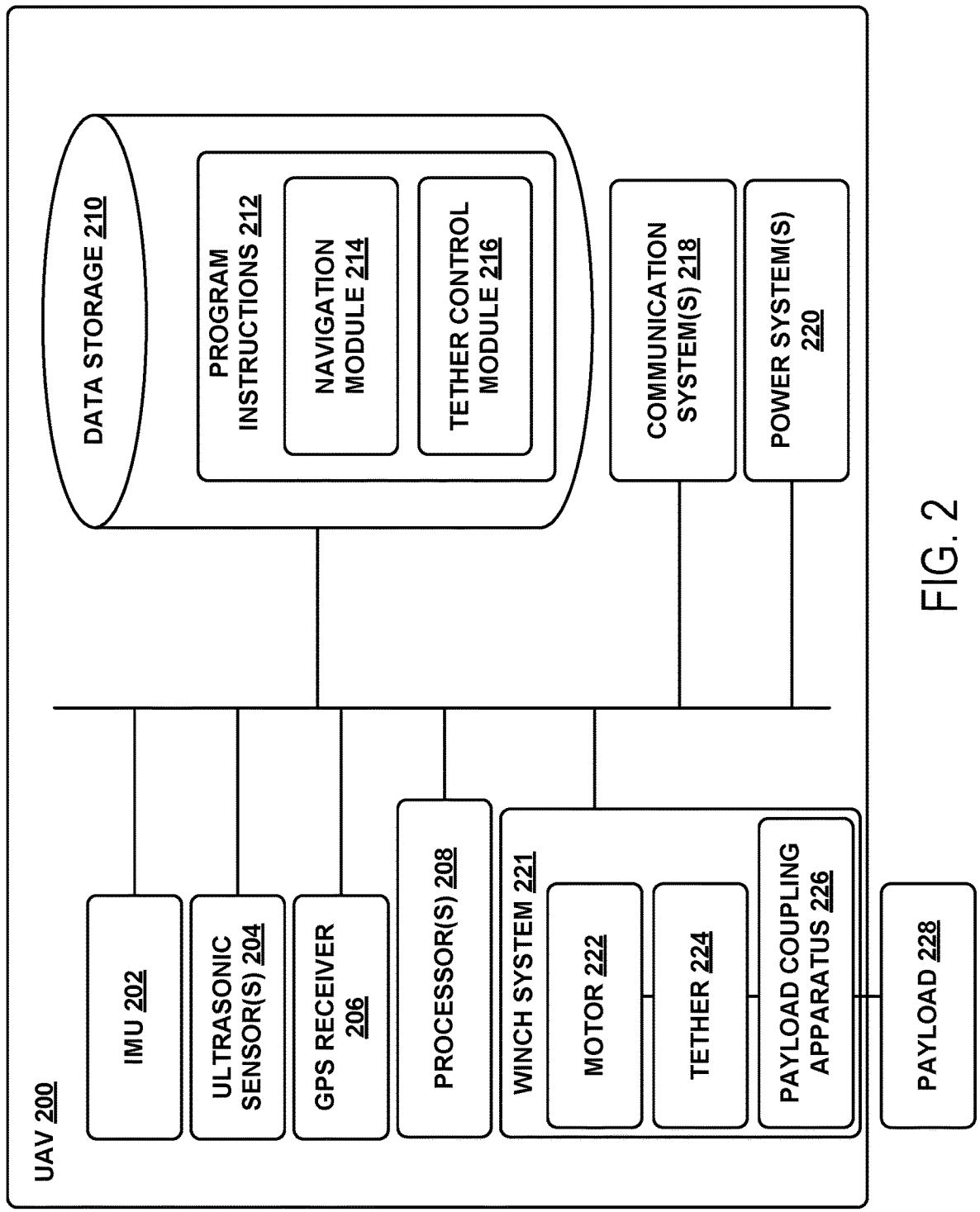
FIG. 2 is a simplified block diagram illustrating components of an unmanned aerial vehicle, according to an example implementation.

FIG. 2 is a simplified block diagram illustrating components of a UAV 200, according to an example implementation. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated implementation, the sensors of UAV 200 include an inertial measurement unit (IMU) 202, ultrasonic sensor(s) 204, and a GPS 206, among other possible sensors and sensing systems.

In the illustrated implementation, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some implementations, the data storage 210 can be implemented using a single physical device (e.g., one optical, magnetic, organic or other memory or disc storage unit), while in other implementations, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated implementation, program instructions 212 include a navigation module 214 and a tether control module 216.

A. Sensors

In an illustrative implementation, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some implementations, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated implementation, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some implementations, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e,g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some implementations, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in reaching the specific target delivery location. For example, the UAV 200 may display a visual message requesting such assistance in a graphic display, with the visual message possibly indicating the specific target delivery location, among other possibilities. In another example, the UAV 200 may play an audio message or tone through speakers to indicate the need for such assistance, with the audio message or tone possibly indicating the specific target delivery location, among other possibilities. In practice, such a feature can be useful in a scenario in which the UAV is unable to use sensory functions or another location-determination technique to reach the specific target location. However, this feature is not limited to such scenarios.

In some implementations, once the UAV 200 arrives at the general area of a target delivery location, the UAV 200 may utilize a beacon from a user's remote device (e.g., the user's mobile phone) to locate the remote device, person, or location. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 902.11 protocol), Long-Term Evolution (LTE), WiMAX (e.g., an IEEE 902.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some implementations, a UAV 200 may include communication systems 218 that allow for both short-range communication and long-range communication. For example, the UAV 200 may be configured for short-range communications using Bluetooth and for long-range communications under a CDMA protocol. In such an implementation, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other implementations, a payload 228 may simply be the one or more items that are being delivered (e.g., without any package housing the items).

In some implementations, the payload 228 may be attached to the UAV and located substantially outside of the UAV during some or all of a flight by the UAV. For example, the package may be tethered or otherwise releasably attached below the UAV during flight to a target location. In an implementation where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some implementations, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some implementations, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some implementations, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some implementations, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example implementation.

In the illustrative UAV system 300, an access system 302 may allow for interaction with, control of, and/or utilization of a network of UAVs 304. In some implementations, an access system 302 may be a computing system that allows for human-controlled dispatch of UAVs 304. As such, the control system may include or otherwise provide a user interface through which a user can access and/or control the UAVs 304.

In some implementations, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative implementation, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example implementation, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some implementations, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other implementations, the local dispatch system 312 may be implemented at a location that is remote to its associated deployment system(s) 314 and UAV(s) 304.

Numerous variations on and alternatives to the illustrated configuration of the UAV system 300 are possible. For example, in some implementations, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an implementation, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some implementations, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some implementations, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some implementations, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Example System and Apparatus for Payload Pickup and Delivery

FIGS. 4A, 4B, and 4C show a UAV 400 that includes a payload pickup and delivery system 410, according to an example implementation. As shown, payload system 410 for UAV 400 includes a tether 402 coupled to a spool 404, a payload latch 406, and a payload 408 coupled to the tether 402 via a payload coupling apparatus 412. The payload latch 406 can function to alternately secure payload 408 and release the payload 408 upon delivery. For instance, as shown, the payload latch 406 may take the form of one or more pins that can engage the payload coupling apparatus 412 (e.g., by sliding into one or more receiving slots in the payload coupling apparatus 412). Inserting the pins of the payload latch 406 into the payload coupling apparatus 412 may secure the payload coupling apparatus 412 within a receptacle 414 on the underside of the UAV 400, thereby preventing the payload 408 from being lowered from the UAV 400. In some implementations, the payload latch 406 may be arranged to engage the spool 404 or the payload 408 rather than the payload coupling apparatus 412 in order to prevent the payload 408 from lowering. In other implementations, the UAV 400 may not include the payload latch 406, and the payload delivery apparatus may be coupled directly to the UAV 400.

In some implementations, the spool 404 can function to wing and unwind the tether 402 such that the payload 408 can be lowered to or lifted from the ground with the tether 402 and the payload coupling apparatus 412 from UAV 400. The payload 408 may itself be an item for pickup and/or delivery, and may be housed within (or otherwise incorporate) a parcel, container, or other structure that is configured to interface with the payload latch 406. In practice, the payload system 410 of UAV 400 may function to autonomously lower payload 408 to the ground and/or lift the payload 408 from the ground in a controlled manner to facilitate pickup and/or delivery of the payload 408 on the ground while the UAV 400 hovers above.

As shown in FIG. 4A, for instance, the payload latch 406 may be in a closed position (e.g., pins engaging the payload coupling apparatus 412) to hold the payload 408 against or close to the bottom of the UAV 400, or even partially or completely inside the UAV 400, during flight from a launch site to a target location 420. The target location 420 may be a point in space directly above a desired delivery location. Then, when the UAV 400 reaches the target location 420, the UAV's control system (e.g., the tether control module 216 of FIG. 2) may toggle the payload latch 406 to an open position (e.g., disengaging the pins from the payload coupling apparatus 412), thereby allowing the payload 408 to be lowered from the UAV 400. The control system may further operate the spool 404 (e.g., by controlling the motor 222 of FIG. 2) such that the payload 408, secured to the tether 402 by a payload coupling apparatus 412, is lowered to the ground, as shown in FIG. 4B.

Once the payload 408 reaches the ground, the control system may continue operating the spool 404 to lower the tether 402, causing over-run of the tether 402. During over-run of the tether 402, the payload coupling apparatus 412 may continue to lower as the payload 408 remains stationary on the ground. The downward momentum and/or gravitational forces on the payload coupling apparatus 412 may cause the payload 408 to detach from the payload coupling apparatus 412 (e.g., by sliding off a hook of the payload coupling apparatus 412). After releasing payload 408, the control system may operate the spool 404 to retract the tether 402 and the payload coupling apparatus 412 toward the UAV 400. Once the payload coupling apparatus reaches or nears the UAV 400, the control system may operate the spool 404 to pull the payload coupling apparatus 412 into the receptacle 414, and the control system may toggle the payload latch 406 to the closed position, as shown in FIG. 4C.

In some implementations, when lowering the payload 408 from the UAV 400, the control system may detect when the payload 408 and/or the payload coupling apparatus 412 has been lowered to be at or near the ground based on an unwound length of the tether 402 from the spool 404. Similar techniques may be used to determine when the payload coupling apparatus 412 is at or near the UAV 400 when retracting the tether 402. As noted above, the UAV 400 may include an encoder for providing data indicative of the rotation of the spool 404. Based on data from the encoder, the control system may determine how many rotations the spool 404 has undergone and, based on the number of rotations, determine a length of the tether 402 that is unwound from the spool 404. For instance, the control system may determine an unwound length of the tether 402 by multiplying the number of rotations of the spool 404 by the circumference of the tether 402 wrapped around the spool 404. In some implementations, such as when the spool 404 is narrow or when the tether 402 has a large diameter, the circumference of the tether 402 on the spool 404 may vary as the tether 402 winds or unwinds from the tether, and so the control system may be configured to account for these variations when determining the unwound tether length.

In other implementations, the control system may use various types of data, and various techniques, to determine when the payload 408 and/or payload coupling apparatus 412 have lowered to be at or near the ground. Further, the data that is used to determine when the payload 408 is at or near the ground may be provided by sensors on UAV 400, sensors on the payload coupling apparatus 412, and/or other data sources that provide data to the control system.

In some implementations, the control system itself may be situated on the payload coupling apparatus 412 and/or on the UAV 400. For example, the payload coupling apparatus 412 may include logic module(s) implemented via hardware, software, and/or firmware that cause the UAV 400 to function as described herein, and the UAV 400 may include logic module(s) that communicate with the payload coupling apparatus 412 to cause the UAV 400 to perform functions described herein.

Figure 5A:
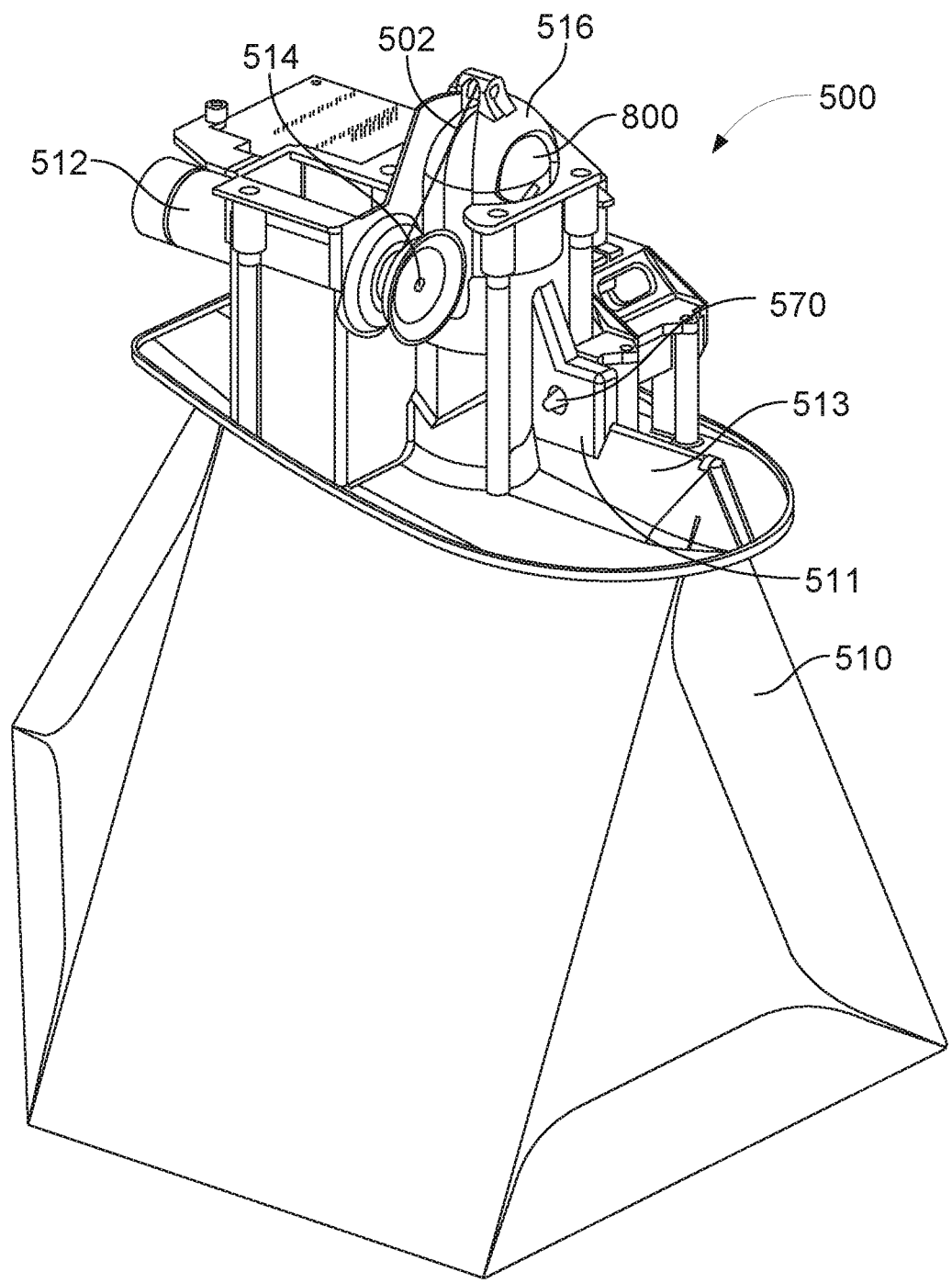
FIG. 5A shows a perspective view of a payload pickup and delivery apparatus including a payload, according to an example implementation.

FIG. 5A shows a perspective view of a payload pickup and delivery apparatus 500 including payload 510, according to an example implementation. The payload apparatus 500 is positioned within a fuselage of a UAV (not shown) and includes a winch 514 powered by motor 512, and a tether 502 spooled onto winch 514. The tether 502 is attached to a payload coupling apparatus 500 positioned within a payload coupling apparatus receptacle 516 positioned within the fuselage of the UAV (not shown). A payload 510 is secured to the payload coupling apparatus 500. In this implementation a top portion 513 of payload 510 is secured within the fuselage of the UAV. A locking pin 570 is shown extending through handle 511 attached to payload 510 to positively secure the payload beneath the UAV during high speed flight.

Figure 5B:
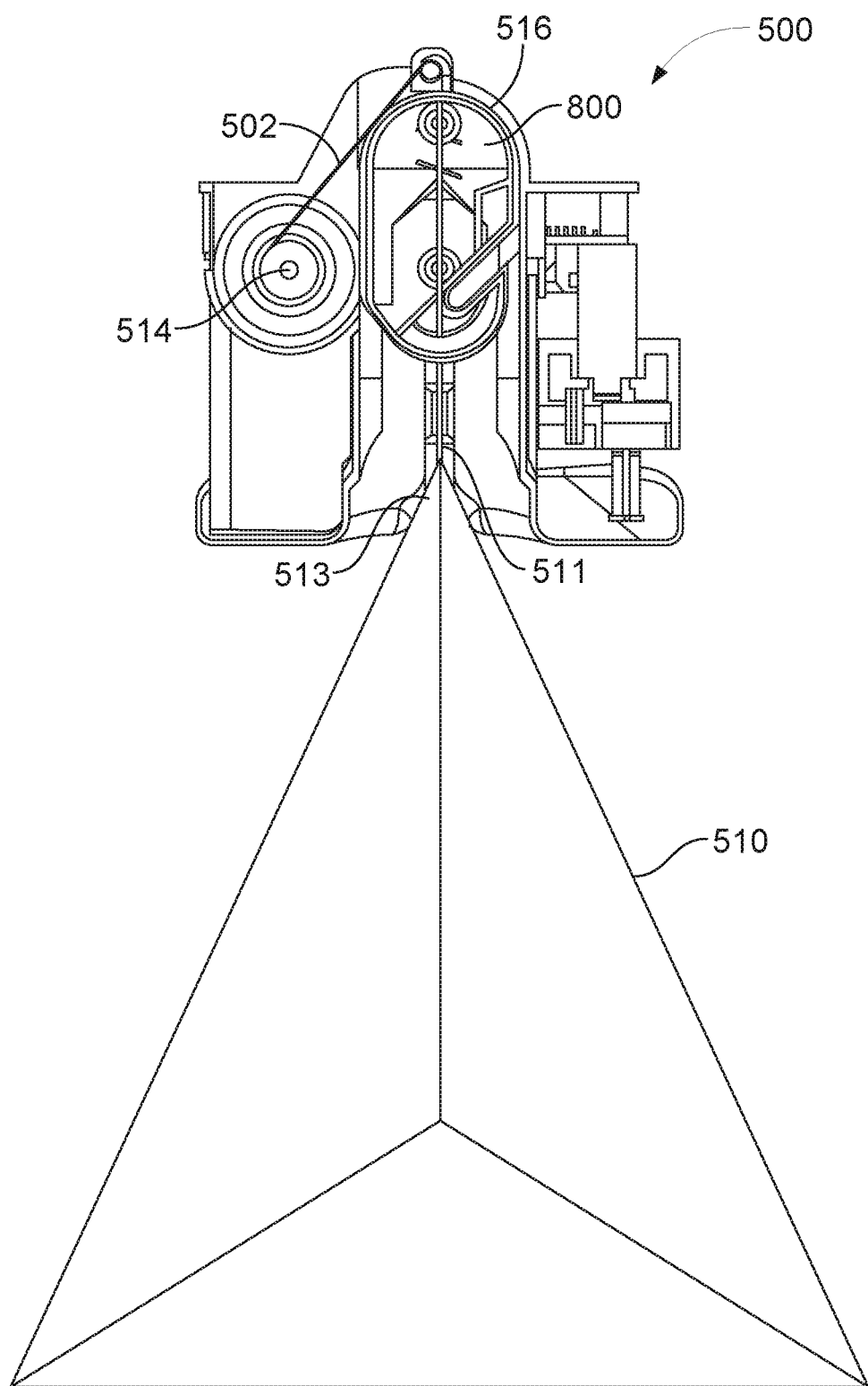
FIG. 5B is a cross-sectional side view of payload pickup and delivery apparatus and a payload shown in FIG. 5A.

FIG. 5B is a cross-sectional side view of payload apparatus 500 and payload 510 shown in FIG. 5A. In this view, the payload coupling apparatus is shown tightly positioned with the payload coupling apparatus receptacle 516. Tether 502 extends from winch 514 and is attached to the top of payload coupling apparatus 500. Top portion 513 of payload 510 is shown positioned within the fuselage of the UAV (not shown) along with handle 511.

Figure 5C:
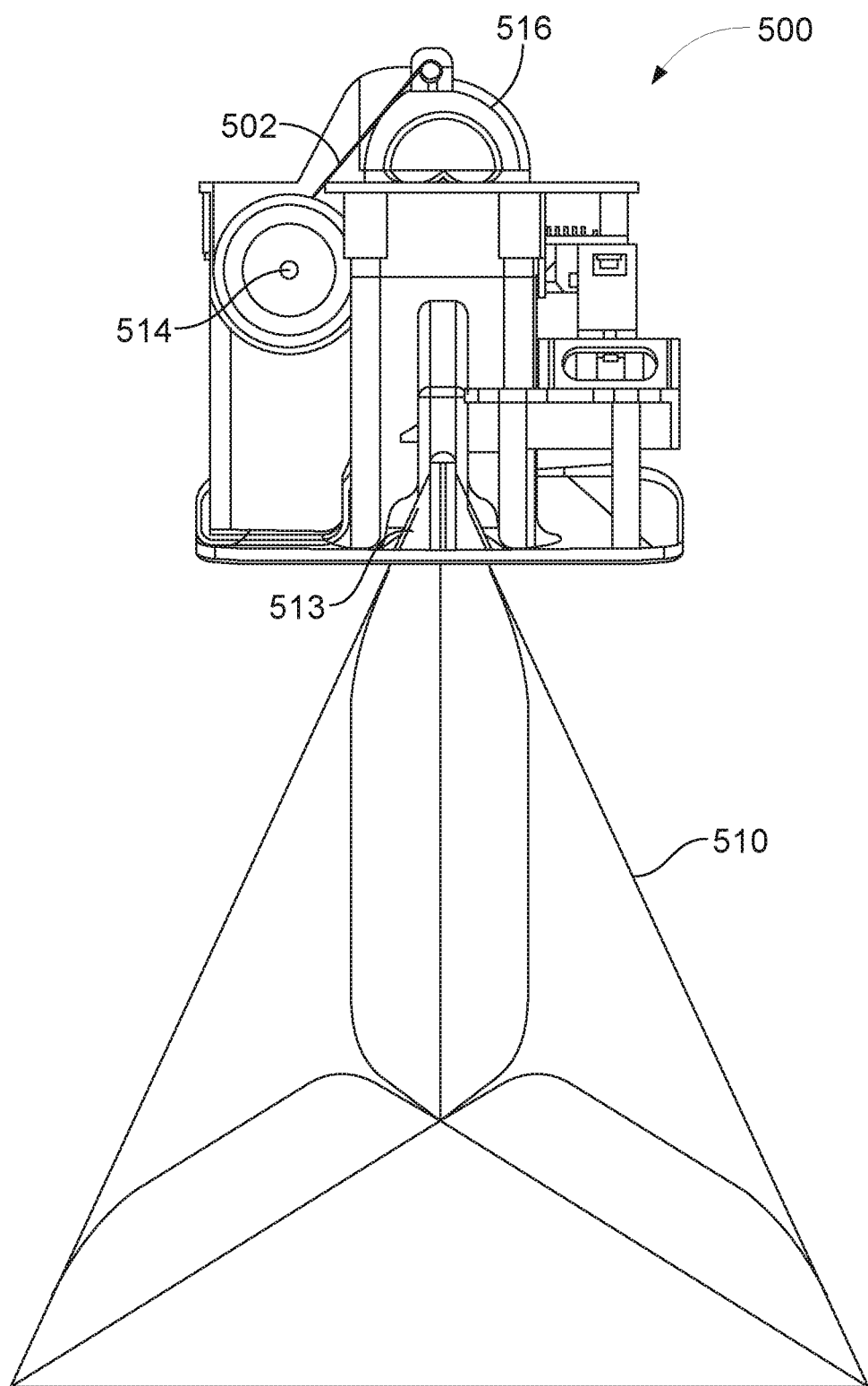
FIG. 5C is a side view of payload pickup and delivery apparatus and payload shown in FIGS. 5A and 5B.

FIG. 5C is a side view of payload apparatus 500 and payload 510 shown in FIGS. 5A and 5B. The top portion 513 of payload 510 is shown positioned within the fuselage of the UAV. Winch 514 has been used to wind in tether 502 to position the payload coupling apparatus within payload coupling apparatus receptacle 516. FIGS. 5A-C disclose payload 510 taking the shape of an aerodynamic hexagonally-shaped tote, where the base and side walls are six-sided hexagons and the tote includes generally pointed front and rear surfaces formed at the intersections of the side walls and base of the tote providing an aerodynamic shape.

VI. Illustrative Methods

As noted, disclosed herein is an interface that facilitates interactions between a sender that is sourcing item(s) and a server that coordinates assignments of UAV(s). The server could be incorporated as part of the access system 302, the central dispatch system 310, the local dispatch system 312, and/or the deployment system 314, among other options. Moreover, the interface may be a graphical interface that could be displayed by a display device of a computing system. In practice, the computing system could be a remote device, such as remote device 306 for instance, that is in communication with the server at issue. Thus, the server could have access to account information (e.g., stored in user-account database 316) associated with the computing system at issue, such as information about the source location associated with the computing system and/or information about items (e.g., respective weights of items) associated with the source location, among others. Yet further, in some implementations, the server and the computing device could be incorporated into a single system or device. Note that the server and the computing system are described in more detail below.

Figure 6:
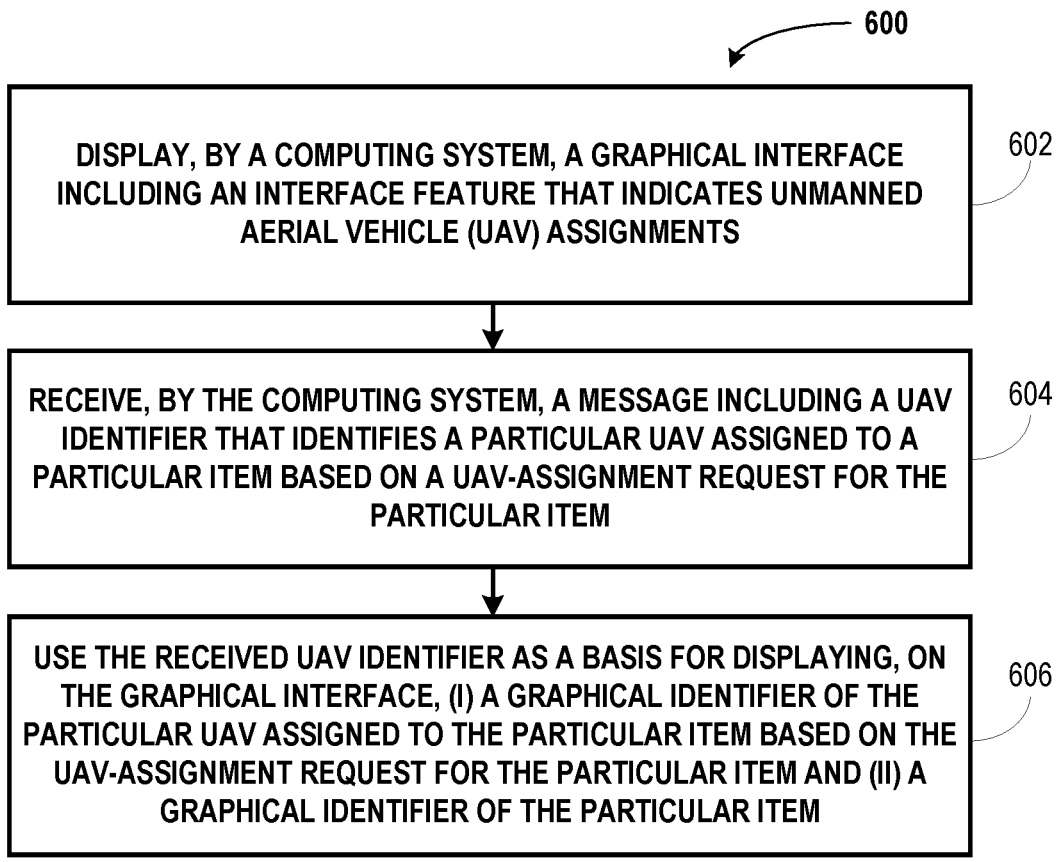
FIG. 6 illustrates an example flowchart for facilitating display of UAV assignments, according to an example implementation.

FIG. 6 is a flowchart illustrating a method 600, according to an example implementation. Illustrative methods, such as method 600, may be carried out in whole or in part within an arrangement involving, for example, the computing system 1000 of FIG. 10 and/or the server 1120 of FIG. 11 (or more particularly by one or more components or subsystems thereof, such as by a processor and a non-transitory computer-readable medium having instructions that are executable to cause a system to perform functions described herein). However, it should be understood that example methods, such as method 600, may be carried out by other entities or combinations of entities as well as in other arrangements, without departing from the scope of the disclosure.

Method 600 and other processes and methods disclosed herein may include one or more operations, functions, or actions as illustrated by one or more of blocks 902-906 for instance. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 8 may represent circuitry that is wired to perform the specific logical functions in the process.

At block 602, method 600 involves displaying, by a computing system, a graphical interface comprising an interface feature that indicates UAV assignments. Additionally, at block 604, method 600 involves receiving, by the computing system, a message comprising a UAV identifier that identifies a particular UAV assigned to a particular item based on a UAV-assignment request for the particular item. Further, at block 606, method 600 involves using the received UAV identifier as a basis for displaying, on the graphical interface, (i) a graphical identifier of the particular UAV assigned to the particular item based on the UAV-assignment request for the particular item and (ii) a graphical identifier of the particular item.

Figure 7:
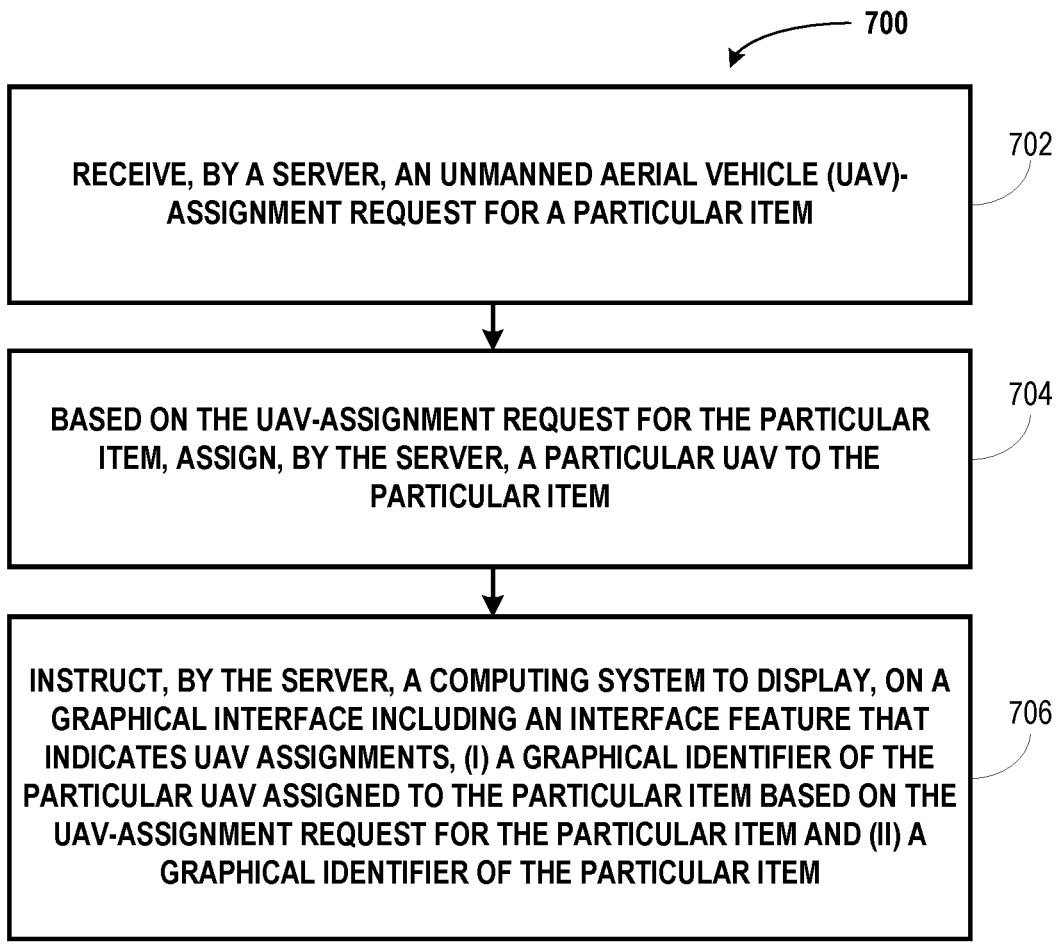
FIG. 7 illustrates another example flowchart for facilitating display of UAV assignments, according to an example implementation.

FIG. 7 is next a flowchart illustrating another method 700, according to an example implementation. At block 702, method 700 involves receiving, by a server, a UAV-assignment request for a particular item. Additionally, at block 704, method 700 involves, based on the UAV-assignment request for the particular item, the server assigning a particular UAV to the particular item. Further, at block 706, method 700 involves the server instructing a computing system to display, on a graphical interface comprising an interface feature that indicates UAV assignments, (i) a graphical identifier of the particular UAV assigned to the particular item based on the UAV-assignment request for the particular item and (ii) a graphical identifier of the particular item. Other methods are possible as well.

VII. Example Arrangement to Help Summon and Load a UAV

Figure 8:
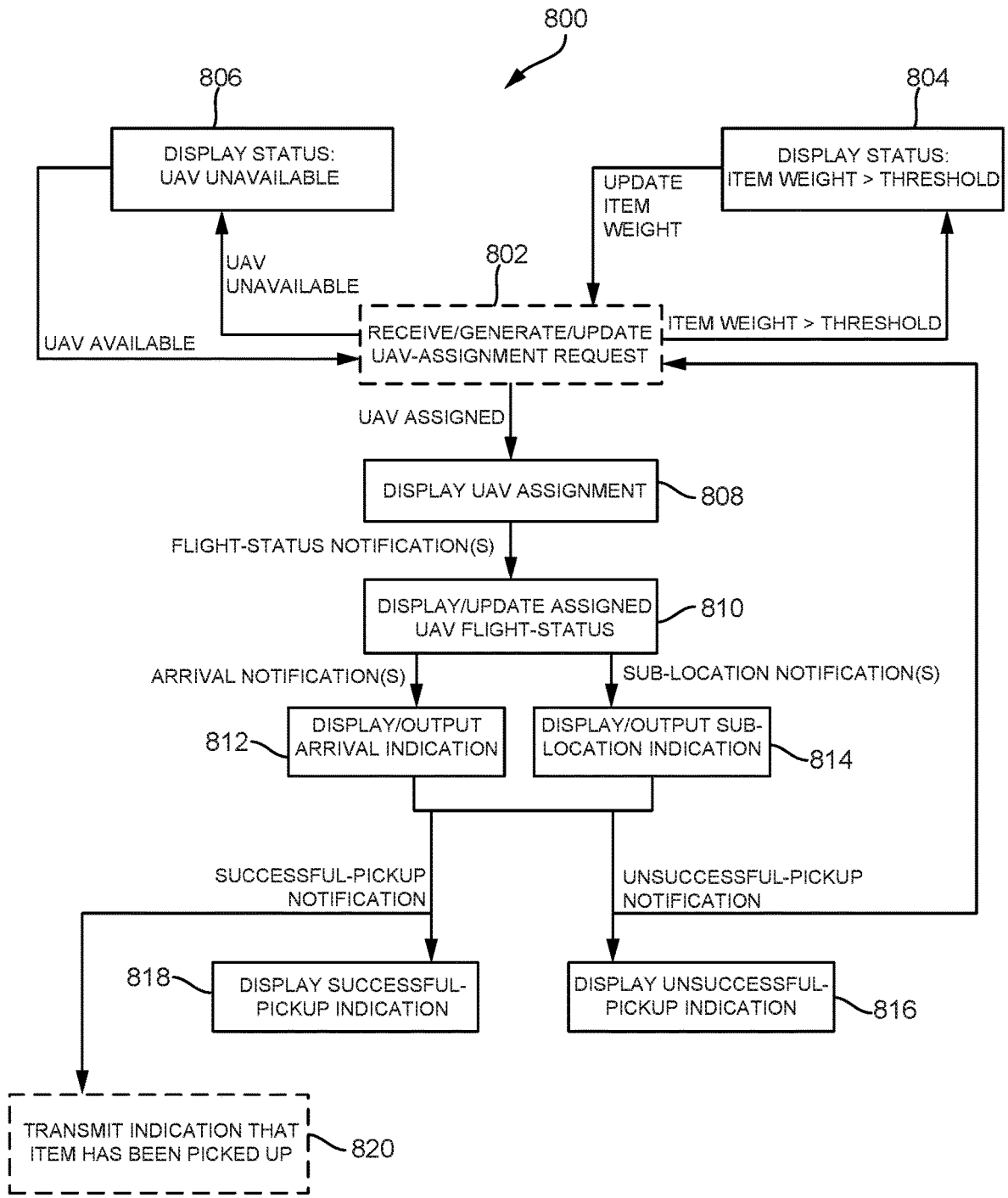
FIG. 8 shows a state diagram illustrating operations carried out by a computing system and/or a server, according to an example implementation.

FIG. 8 next shows a state diagram 800 illustrating some of the operations that the computing system and/or the server may carry out in accordance with the present disclosure, such as those introduced by the methods 600 and 700 above, among others. Although the present disclosure is often described herein in reference to the state diagram 800, it should be understood that state diagram 800 is not meant to be limiting. For example, although various states are illustrated in a particular order, these states may also occur in a different order than that described herein. Furthermore, certain states may be combined into fewer states, divided into additional states, and/or removed based upon the desired implementation.

A. UAV-Assignment Request

At state 802, a UAV-assignment request may be received, with the UAV-assignment request being a request to have a UAV assigned to pick up a particular item at a source location for subsequent transport of that item to another location. Based on the UAV-assignment request, the server could then coordinate an assignment of a UAV. Furthermore, the UAV-assignment request could include information, such as an identifier of the item, a weight of the item, an indication of the source location, an indication of the other location to which the item is to be transported, a pickup time indicating a time that the item should be picked up at the source location, and/or a delivery time indicating a time that the item should be delivered at the other location, among other possibilities.

Moreover, the UAV-assignment request may be generated at the server or may be received at the server via the computing system, among other options.

In one case, the computing system may receive the UAV-assignment request, and may then transmit or otherwise forward the UAV-assignment request to the server. Generally, the computing system may receive the UAV-assignment request in one of various ways. For example, the computing system may receive via an input method editor (IME) (e.g., a touchscreen display) input data indicative of the UAV-assignment request. In another example, the computing system could be arranged to receive data from a scanner device configured to scan labels having information encoded thereon. With this arrangement, an individual (e.g., restaurant staff) may scan a label (e.g., QR code) affixed to that item and that scanning may serve as an indication to the computing system of a request to have a UAV assigned to pick up and transport that item. Moreover, through the scanning, the computing system could obtain various types of information (e.g, an identifier of the item) to be included in the request. Other examples are also possible.

Regardless of how the UAV-assignment request is received at the computing system, the UAV-assignment request could be provided following receipt of a transport request for the particular item, which could be received at the same computing system, at another computing system associated with the source location (e.g., another computing system at a restaurant), and/or in other ways. Generally, the transport request may be a request to have the particular item transported from a source location to another location, and the transport request could include other information, such as an identifier of the item, an indication of the source location, an indication of the other/target location to which the item is to be transported, and/or a delivery time, among other options. By way of example, the transport request could be an item (e.g., food) delivery order placed via an application of a customer's mobile device. Other examples are also possible.

As such, when the UAV-assignment request is inputted at the computing device, the UAV-assignment request could be based on the transport request. For instance, UAV-assignment request could be inputted to include an identifier of the transport request (e.g., encoded in a label affix on the item), so that the server could obtain (e.g., from the computing system), based the included identifier, the other information associated with the transport request. Additionally or alternatively, the UAV-assignment request may include the other information automatically based the transport request identifier if that identifier is provided as part of the UAV-assignment request. In either approach, the other information about the transport request may be concealed when the UAV-assignment request is inputted. But in some implementations, the other information could be manually inputted as part of the UAV-assignment request and thus may not be concealed. Other implementations are also possible.

In another case, the computing system may automatically generate the UAV-assignment request based on the transport request, and may then transmit or otherwise forward the generated UAV-assignment request to the server. In particular, the computing system may receive (directly or via another computing system associated with the source location) the transport request for the particular item. And the computing system may then use information associated with the transport request as basis for generating the UAV-assignment request. For example, the computing system may use the delivery time and the target location associated with the transport request as basis for determining a pickup time at which the particular item should be picked up at the source location so that an assigned UAV could then subsequently transport and deliver the particular item at the target location by the delivery time. Thus, once the computing system determines pickup time, the computing system may then generate a UAV-assignment request specifying at least that pickup time for the particular item, and may then transmit or otherwise forward the generated UAV-assignment request to the server. Other examples are also possible.

In yet another case, the server may receive the transport request and may then generate the UAV-assignment request based on the transport request. In particular, the server could receive the transport request directly from a device that initiates the transport request (e.g., a customer placing a food order via an application). Additionally or alternatively, the server may receive the transport request from the computing system associated with the source location, such as after the computing system receives the transport request. In either case, the server may generate the UAV-assignment request based on the transport request in various ways. For example, in-line with the example discussed above, the server could determine a pickup time at which the particular item should be picked up at the source location, and the server could then generate the UAV assignment request such that the UAV-assignment request specifies at least that pickup time for the particular item. Other cases and examples are also possible.

Figure 9A:
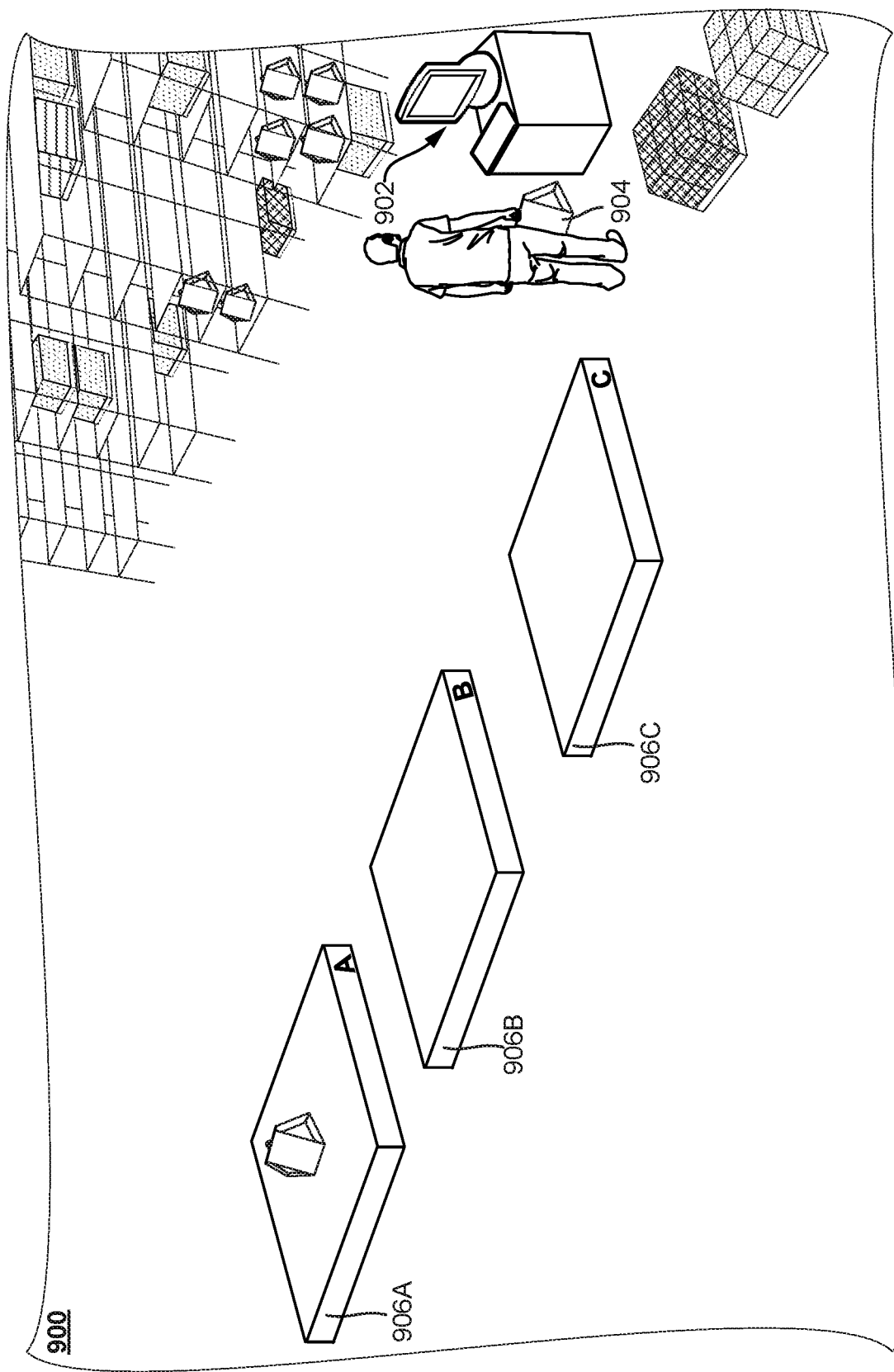
FIGS. 9A to 9P collectively illustrate a scenario in which a graphical interface is used to facilitate and monitor a UAV assignment, according to an example implementation.

FIGS. 9A to 9O collectively illustrate an example scenario in which a graphical interface is used to facilitate and monitors a UAV assignment that is based on a UAV-assignment request. And FIGS. 9A to 9D specifically illustrate submission of the UAV-assignment request following receipt of a transport request.

In particular, FIG. 9A illustrates a source location 900 corresponding to a loading environment of a business (e.g., a restaurant named "Sandwich Shop") in which items can be respectively loaded onto UAVs for subsequent transport. As shown, the source location 900 includes a computing system 902 at which an individual could submit UAV-assignment requests for various items, such as for item 904. Additionally, FIG. 9A illustrates that the source location 900 includes three platforms corresponding to sub-locations 906A-906C (could also be referred to as pickup locations 906A-906C) at which UAVs could respectively pick up items for subsequent transport.

FIG. 9B then illustrates example screens 908-910 that could be displayed on a customer's mobile device, so that the customer could submit a transport request. In particular, screen 908 illustrates selection of the item 904 (e.g., "veggie sandwich") associated with the source location 900 (e.g., an item sold by the restaurant "Sandwich Shop"). Also, screen 910 illustrates selection of a target location 912 to which the item 904 should be transported from the source location 900. As such, a customer may submit the transport request for item 904 and the computing system 902 may receive the transport request.

Figure 9C:
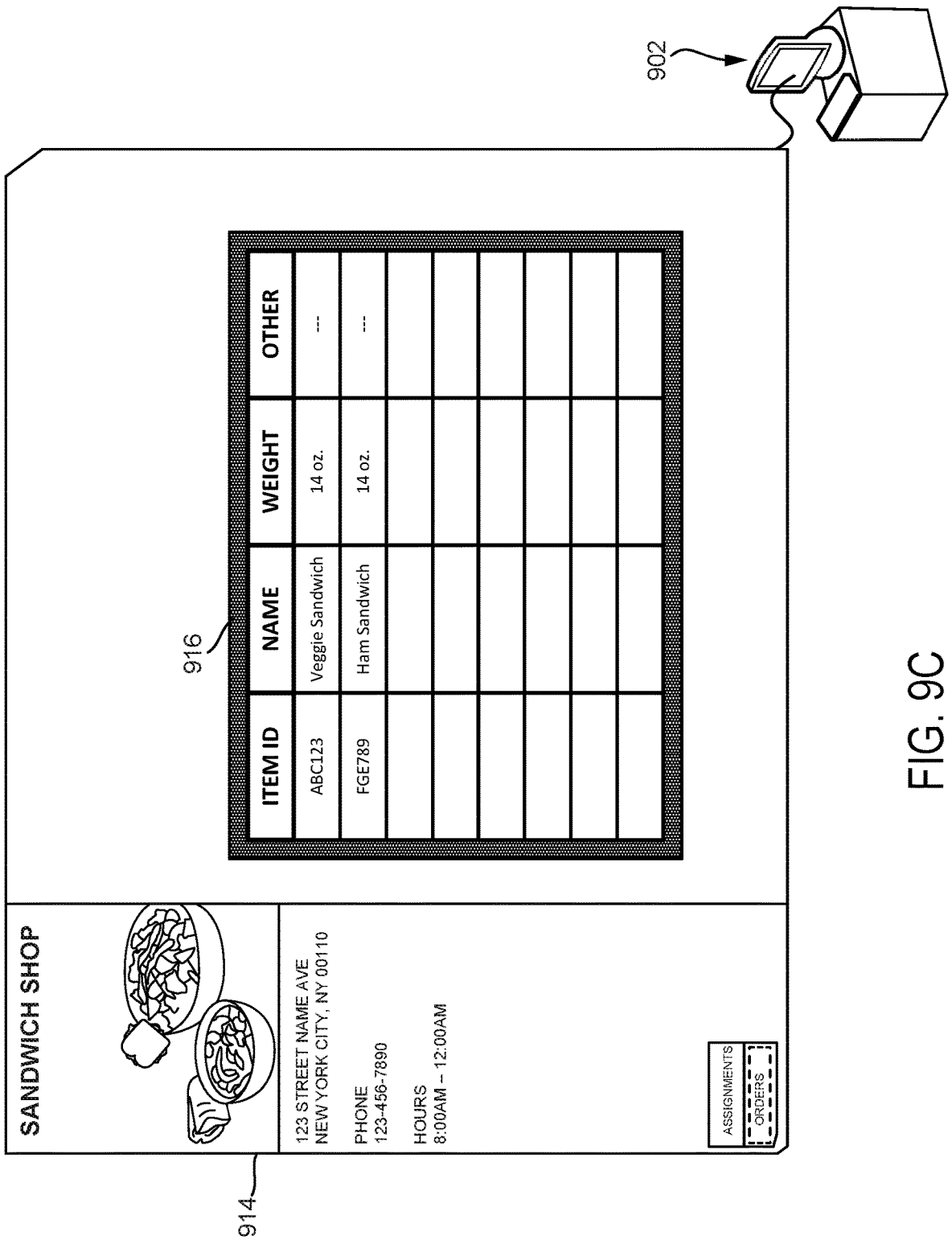

FIG. 9C then illustrates an example screen state 914 of a graphical interface displayed by the computing system 902. As shown, the screen state 914 includes an interface feature 916 including listing of orders that the restaurant is to complete. Specifically, the feature 916 includes a listing of an order corresponding to the transport request submitted by the customer in-line with the discussion of FIG. 9B. Namely, the feature 916 lists the item ID (e.g., "ABC123"), the item name (e.g., "veggie sandwich"), and the item weight (e.g., "14 oz"), and could also include other information. Given this, an individual at the restaurant could then facilitate a UAV-assignment request for the item 904.

Figure 9D:
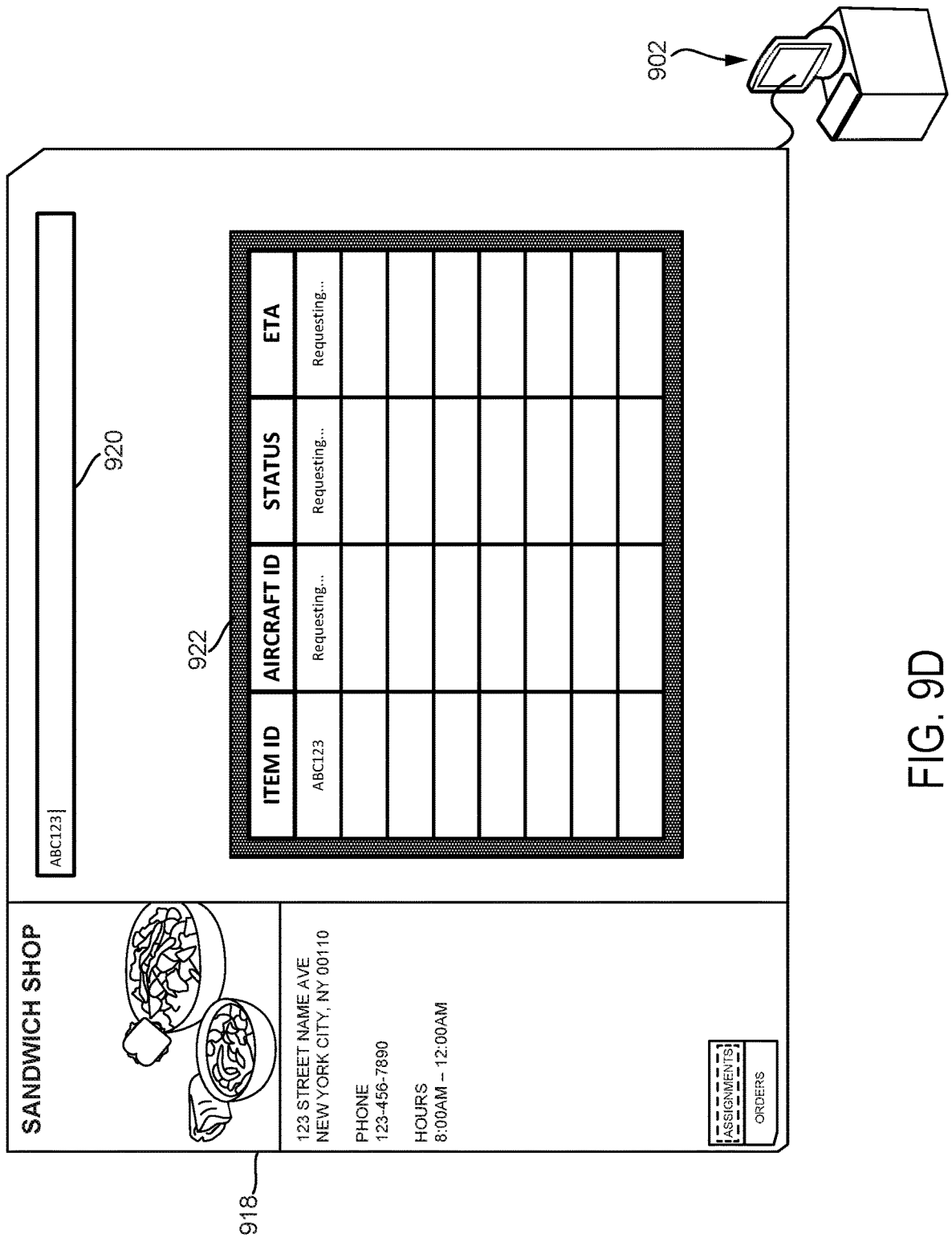

FIG. 9D illustrates another example screen state 918 of the graphical interface displayed by the computing system 902. Specifically, screen state 918 includes an interface feature 920 through which a UAV-assignment request could be submitted. As shown, the item ID of the item 904 could be inputted using the feature 920 and, once inputted, the UAV-assignment request for the item 904 could be transmitted to a server in-line with the discussion above. Further, the graphical interface at issue may also include an interface feature 922 that displays which UAV (e.g., aircraft ID) has been assigned to which item (e.g., item ID) as well as information related to the status of that assignment and an estimated time-of-arrival (ETA) of the assigned UAV. And as shown by FIG. 9D, the UAV-assignment request for item 904 is being facilitated (e.g., "requesting") and thus a UAV has not yet been assigned. Other illustrations are possible as well.

B. Item Weight

In practice, the server may assign a UAV based on various factors, such as based on weight of the item to be transported and/or others. Specifically, the server may identify and then assign a UAV that is capable to lifting the weight of the item (e.g., in accordance with manufacturer specifications). Additionally or alternatively, the server may assign the UAV based on one or more additional factors, such as based on proximity of the UAV to the source location, among other possibilities.

Generally, the server and/or computing system could determine the weight of the item in various ways. For example, the computing system may have stored thereon or otherwise have access to a mapping of items to their respective weights (e.g., approximate weights), and thus the computing system could refer to such mapping to determine a particular weight of a particular item, so as to then include that weight in the UAV-assignment request. In another example, the server could similarly have stored thereon or otherwise have access to such a mapping, such as part of account information (e.g., stored in user-account database 316) associated with the computing system. In this way, the server may determine a particular weight of a particular item, so as to then include that weight in the UAV-assignment request. In yet another example, the computing system may be arranged to receive data from a scale configured to output a weight of one or more items placed on the scale. With this arrangement, an individual (e.g., restaurant staff) may place the item to be picked up on the scale and may then scan a label affixed to that item. Upon the scanning, the computing system may obtain a weight of the item as outputted by the scale on which the item has been placed. As such, the weight may be included as part of the UAV-assignment request. Other examples are also possible.

In accordance with the present disclosure, the server and/or the computing system may determine whether or not a weight of the item exceeds a threshold weight. Generally, the threshold weight may be a predefined threshold weight or may be a weight that is based on weight(s) that a currently available UAV(s) are able to pick up, among other options. Nonetheless, if the computing system carries out this determination and determines that the weight does not exceed the threshold weight, the computing system could then transmit the UAV-assignment request to the server, so that the server could then attempt to assign a UAV based on the request. Similarly, if the server carries out this determination and determines that the weight does not exceed the threshold weight, the server may then attempt to assign a UAV based on the request. However, if the server and/or the computing system determine that the weight of the item does exceed the threshold weight, the server and/or the computing system may then carry out other operations in-line with state 804 of FIG. 8.

Specifically, if the computing system carries out this determination and determines that the weight does exceed the threshold weight, the computing system may responsively display, on the graphical interface, a graphical status indicating that the weight of the item exceeds the threshold weight. Similarly, if the server carries out this determination and determines that the weight does exceed the threshold weight, the computing system may receive from the server an indication that the weight exceeds the threshold weight, and may responsively display, on the graphical interface, a graphical status indicating that the weight of the item exceeds the threshold weight.

In an example implementation, the displayed a graphical status indicating that the weight of the item exceeds the threshold weight could take various forms. In one case, the displayed graphical status may specify in some manner that the weight of the item exceeds the threshold. By way of example, the graphical interface may state "Package too heavy". In another case, the displayed graphical status may be a graphical prompt requesting an update to the weight of the item. By way of example, the graphical interface may state "Package too heavy. Please update the weight of the package."

In either case, the graphical status may serve as an indication to an individual that the weight of the item should be reduced in some manner and that an updated weight should be provided once the weight is reduced. In one example, the graphical status could include a recommendation to split the item into multiple packages, if possible, and to then initiate a separate UAV-assignment request for each such package, so as to then have multiple UAVs assigned for these packages based on initiated UAV-assignment requests. As such, the individual could then take steps in accordance with this recommendation, and thus the computing system may receive multiple UAV-assignment requests for the item at issue. In another example, however, the individual could take other steps to reduce the weight (e.g., reduce the size of the item, if possible), and the computing system may then receive an update to the UAV-assignment request indicating an update to the weight of the particular item. Accordingly, a UAV may then ultimately be assigned based on the updated UAV-assignment request (e.g., based at least on the updated weight of the item). Other cases and examples are also possible.

Figure 9E:
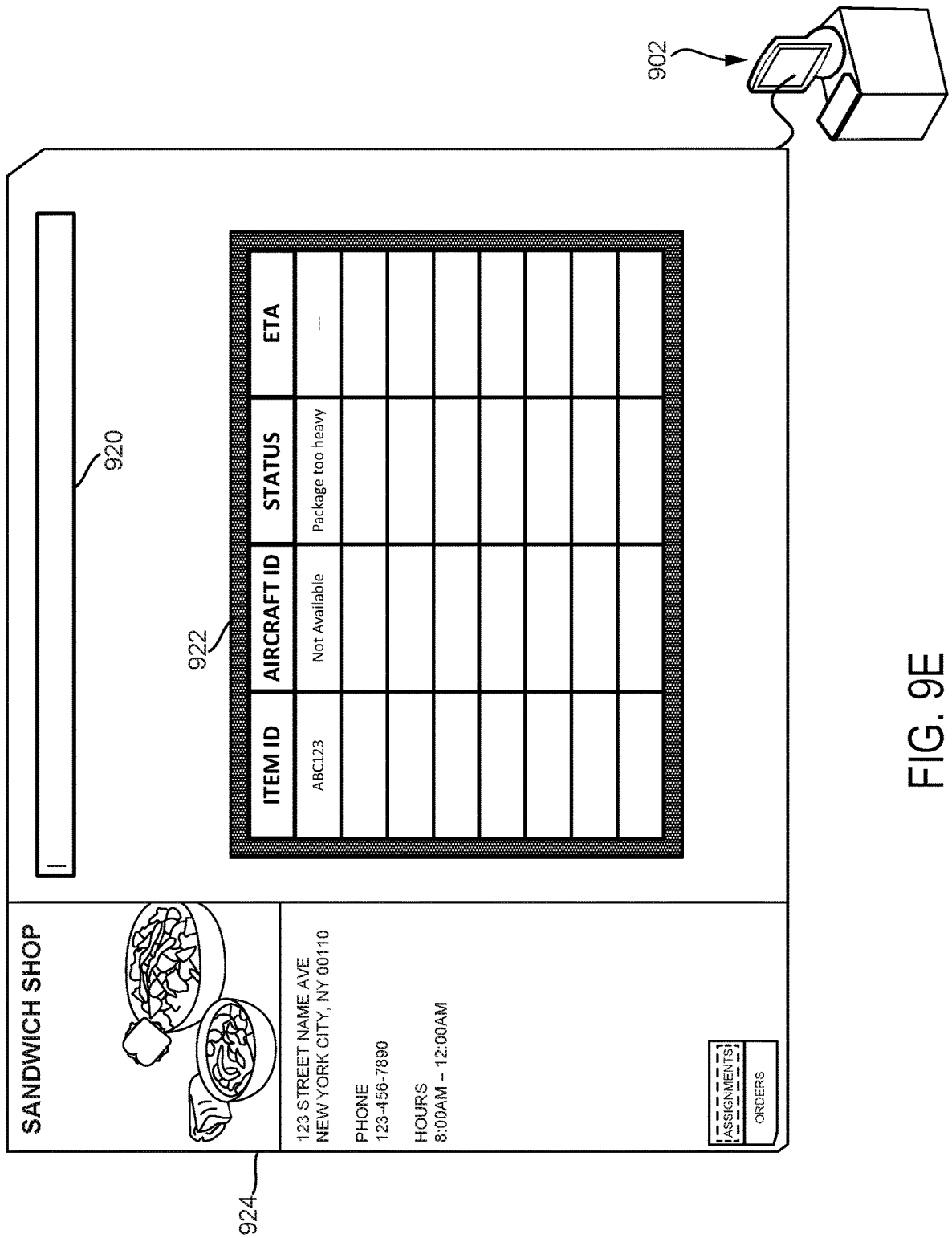

FIG. 9E next illustrates another example screen state 924 of the graphical interface displayed by the computing system 902. Specifically, screen state 924 shows that interface feature 922 has been updated to include a graphical status indicating that the weight of the item 904 exceeds a threshold weight. As shown, the feature 922 specifies that a UAV is "not available" and that the reason for the unavailability is because the "package is too heavy" for any currently available UAV to pick up. Other illustrations are possible as well.

C. UAV Availability

In an example implementation, the server could determine that a UAV is not currently available to be assigned to pick up and transport the particular item, and the server could make such a determination in various ways. For example, the server may determine that a UAV is not currently available to be assigned in response to determining that no UAV is currently located within a threshold distance away from the source location. In another example, the server may determine that a UAV is not currently available to be assigned in response to determining that, from among UAVs currently in proximity to the source location, all UAVs are currently in the process of picking up and/or transporting other items based on other UAV-assignment request (e.g., received from the computing system at issue and/or received from other computing systems of other businesses/individuals). Other examples are possible as well.

In-line with state 806 of FIG. 8, when the server determine that a UAV is not currently available to be assigned, the computing system may receive from the server an unavailability notification indicating that a UAV is not currently available to be assigned. And responsive to receiving the unavailability notification, the computing system may display, on the graphical interface, a graphical status indicating that a UAV is not currently available to be assigned to the particular item. Then, once the server determines that a UAV is available to be assigned, the server may facilitate assignment of a UAV to the particular item as further discussed herein.

Figure 9F:
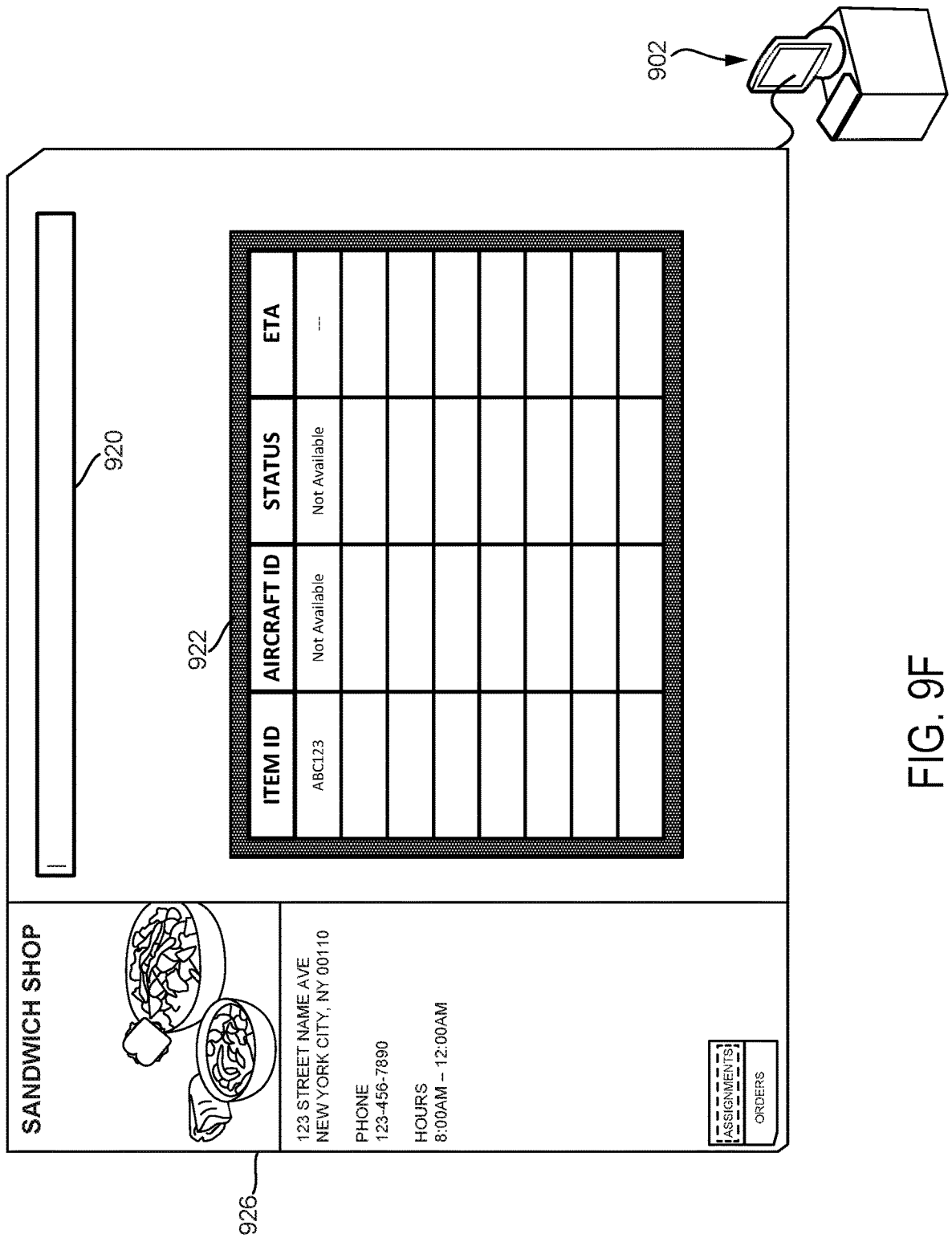

FIG. 9F next illustrates another example screen state 926 of the graphical interface displayed by the computing system 902. Specifically, screen state 926 shows that interface feature 922 has been updated to include a graphical status indicating that a UAV is not currently available to be assigned to the item 904. As shown, the feature 922 specifies that a UAV is "not available". Other illustrations are possible as well.

D. UAV Assignment

Once a UAV has been assigned to the particular item, the computing system may receive from the server a message associated with that assignment. In particular, the message may include a UAV identifier that identifies a particular UAV assigned to the particular item based on the UAV-assignment request for that particular item. In some cases, the message could also include other information as well. For example, the message may include the identifier of item and/or an identifier of the UAV-assignment request (e.g., originally included in the UAV-assignment request), so that the computing system could determine that that identified UAV is assigned to the particular item at issue. Other examples are also possible.

In-line with state 808 of FIG. 8, the computing system may use the received message as basis for displaying the UAV assignment on the graphical interface. In particular, the computing system may use the received UAV identifier as basis for displaying a graphical identifier of the particular UAV assigned to the particular item as well as a graphical identifier of the particular item associated with the UAV-assignment request. Generally, such graphical identifiers could take on any feasible shape or form.

For example, the computing system may display a graphical identifier of the particular UAV in the form of letters and/or numbers representative of the particular UAV, such as letters and/or numbers that correspond to those listed on the particular UAV, thereby helping an individual recognize the assigned UAV when that UAV arrives in the source location. Similarly, the computing system may display a graphical identifier of the particular item in the form of letters and/or numbers representative of the particular item, such as letters and/or numbers that correspond to those listed on the particular item, thereby helping an individual recognize the appropriate item to be loaded onto the UAV. Other examples are also possible.

Figure 9G:
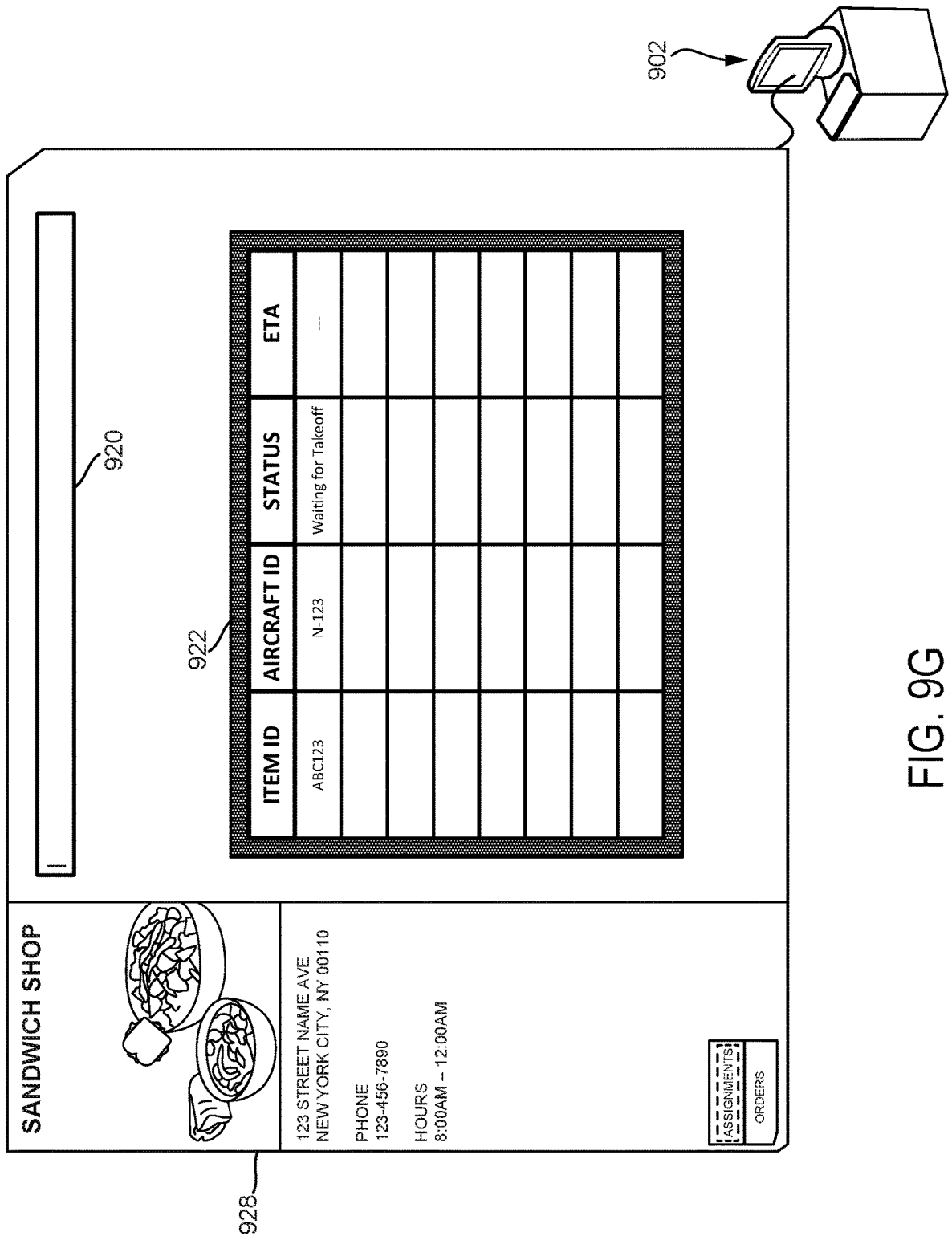

FIG. 9G next illustrates another example screen state 928 of the graphical interface displayed by the computing system 902. Specifically, screen state 928 shows that interface feature 922 has been updated to include both a graphical identifier of the item 904 (e.g., "ABC123") as well as a graphical identifier of the assigned UAV (e.g., "N-123"). Furthermore, the graphical identifier of the item 904 is displayed substantially alongside (e.g., in the same row as) the graphical identifier of the assigned UAV, so as to indicate that the UAV identified as N-123 is assigned to the item 904 identified as ABC 123. Other illustrations are possible as well.

E. UAV Flight-Status

After a UAV is assigned to the particular item, the computing system may continuously or from time-to-time receive flight-status notification(s). In practice, the computing system may receive such flight-status notifications from the server. In this case, the computing system could receive a flight-status notification as part of the above-described message indicating the UAV assignment and/or may receive flight-status notification(s) subsequent to receipt of the message. In some cases, the computing system could additionally or alternatively receive the flight-status from other entities, such as from the assigned UAV and/or other UAVs, among other options In either case, a flight-status notification may indicate a status of flight by the particular UAV assigned to the particular item. Specifically, the status of flight may be of the particular UAV's flight to the source location for pickup of the particular item. Moreover, a flight-status notification could specify various types of information. For example, a flight-status notification could indicate that the particular UAV is waiting for takeoff to the source location. In another example, a flight-status notification could indicate that the particular UAV is en route to the source location. In yet another example, a flight-status notification could indicate an ETA of the particular UAV at the source location. Other examples are also possible.

In-line with state 810 of FIG. 8, when the computing system receives a flight-status notification, the computing system may use the received flight-status notification as basis for displaying, on the graphical interface, a graphical status indicating the status of flight by the particular UAV to the source location for pickup of the particular item. Generally, the graphical status could represent more than one type of information. For example, the graphical status could indicate both that the particular UAV is en route to the source location as well as an ETA at the source location.

Moreover, when the computing system receives an updated flight-status subsequent to receiving a previous flight-status notification, the computing system may use the updated flight-status notification as basis for displaying, on the graphical interface, an updated graphical status indicating an updated status of flight by the particular UAV to the source location for pickup of the particular item. For example, the computing system may remove a displayed graphical status indicating that the particular UAV is waiting for takeoff and may instead display a graphical status indicating that the particular UAV is en route to the source location. Other examples are also possible.

Figure 9H:
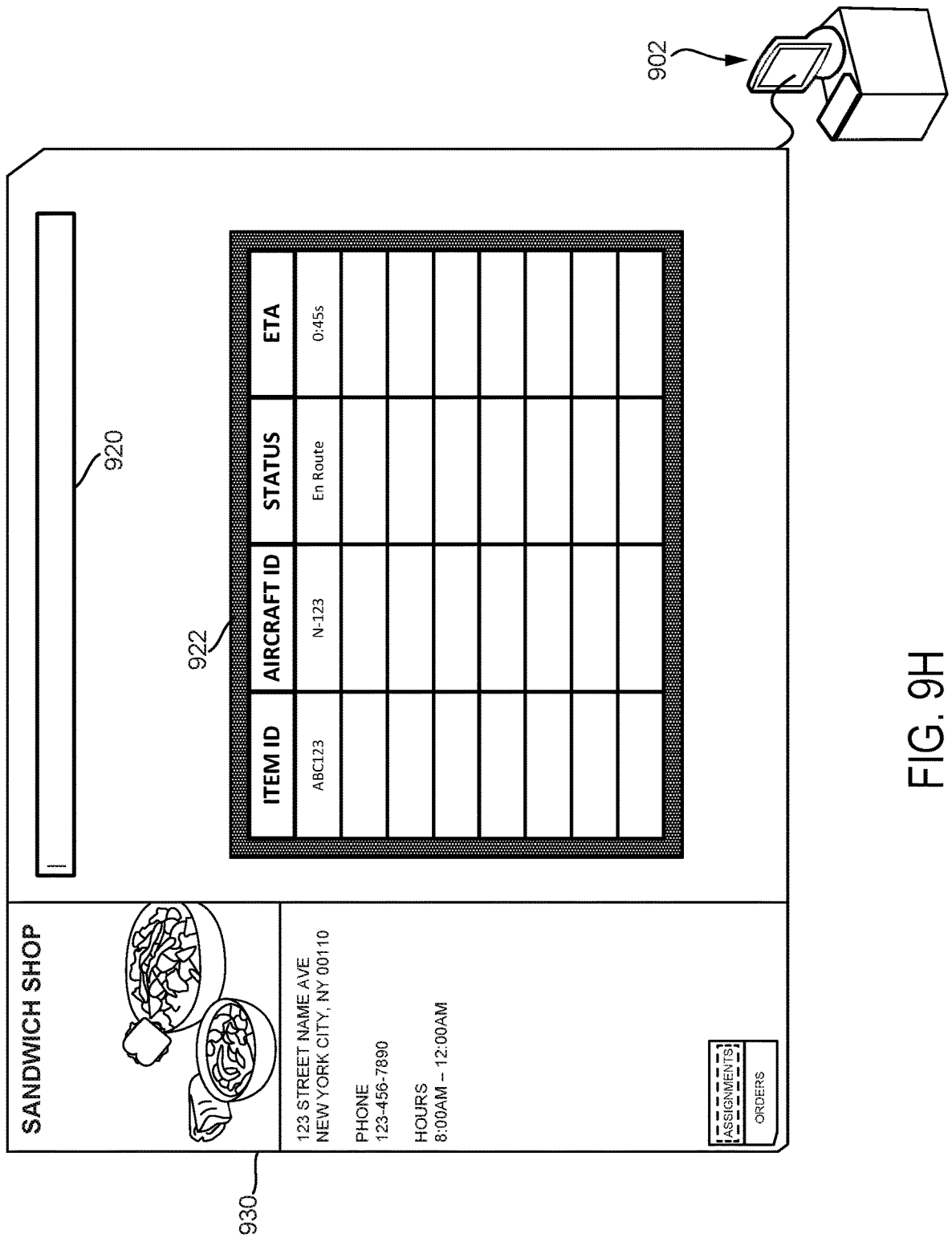

Referring again to FIG. 9G, screen state 928 shows that interface feature 922 has been updated to include a graphical status indicating that the assigned UAV N-123 is "waiting for takeoff." Furthermore, FIG. 9H illustrates yet another example screen state 930 of the graphical interface displayed by the computing system 902. Specifically, screen state 930 shows that the graphical status "waiting for takeoff" has been removed from being displayed via interface feature 922 and that interface feature 922 has been updated to include a graphical status indicating that the assigned UAV N-123 is "en route" to the source location and also indicating an ETA of the assigned UAV N-123 to be in "45 seconds". Other illustrations are possible well.

F. UAV Arrival Indication

Once the assigned UAV is en route to the source location, the computing system may receive an arrival notification indicating that the assigned UAV has arrived at the source location or that arrival of the assigned UAV is imminent at the source location. As with a flight-status notification, the computing system may receive an arrival notification from the server, from the assigned UAV, and/or from other UAVs, among other options. Moreover, in the case in which the arrival notification indicates that arrival of the assigned UAV is imminent at the source location, such an arrival notification could be received responsive to a determination by an entity (e.g., the server) that the assigned UAV is within a threshold distance away from the source location and/or responsive to a determination by the entity that an ETA is less than a threshold ETA (e.g., less than 10 second until arrival of the assigned UAV), among others.

In-line with state 812 of FIG. 8, when the computing system receives an arrival notification, the computing system may responsively output an indication that the assigned UAV has arrived at the source location or that arrival of the assigned UAV is imminent. In practice, the computing system may output such an indication in various ways.

In one case, the computing system may output the indication by using the received arrival notification as basis for displaying, on the graphical interface, a graphical status indicating that the assigned UAV has arrived at the source location or that arrival of the assigned UAV is imminent. Generally, this graphical status could take the form of letters and/or numbers displayed substantially alongside the graphical identifier of the item and/or the graphical identifier of the assigned UAV, so as to indicate that the UAV assigned to that item has arrived or is about to arrive. Additionally or alternatively, the graphical status could take the form of changing other graphical attributes, such as a color and/or shape associated with the displayed assignment.

Figure 9I:
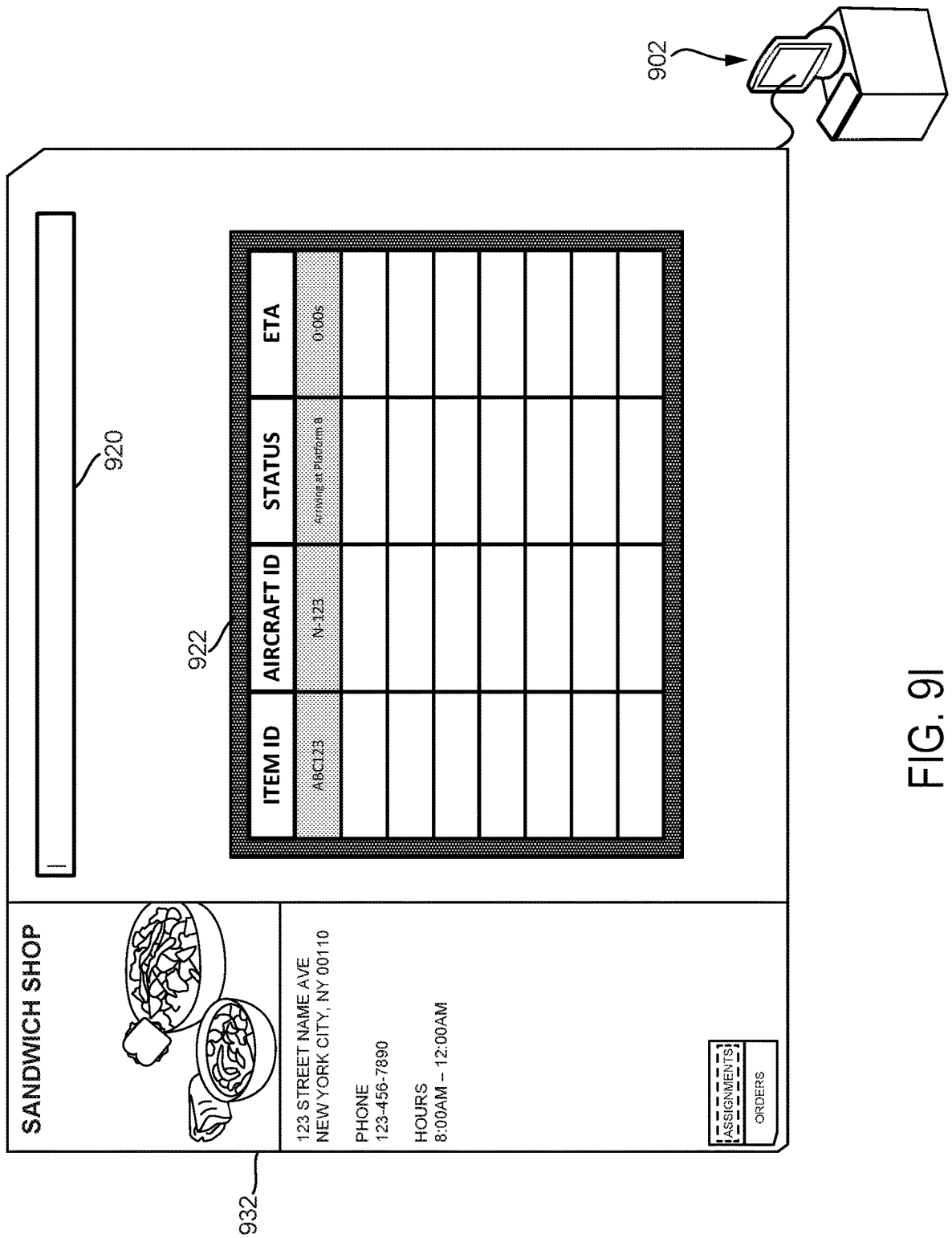

FIG. 9I illustrates yet another example screen state 932 of the graphical interface displayed by the computing system 902. Specifically, screen state 932 shows that the interface feature 922 has been updated to indicate that the assigned UAV N-123 is arriving at the source location and that the ETA is down to "0 seconds." Furthermore, the screen state 932 shows that the color has changed for the row in feature 922 indicating the UAV assignment for item 904. In this way, the graphical interface could help distinguish assignments for which a UAV has arrived or is about to arrive from those for which a UAV has not yet arrived or is not about to arrive. Other illustrations are possible well.

In another case, the computing system may output the indication by causing an audio output device (e.g., a louder speaker) to output an audible alert indicating that the assigned UAV has arrived or that arrival of the particular UAV is imminent at the source location. In practice, the audible alert could be a pre-recorded alert generally indicating that a UAV has arrived or is about to arrive (e.g., outputting of the phrase "UAV arriving"), so that an individual could then refer to the graphical interface to determine which item the arriving UAV is assigned to pick up.

In another situation, however, the audible alert could indicate the particular UAV that has arrived or is about to arrive, such as by indicating the identifier of the particular UAV (e.g., outputting the phrase "UAV N-123 is arriving"). Additionally or alternative, the audible alter could indicate the particular item to which the arriving UAV is assigned, such as by indicating the identifier of the particular item (e.g., outputting the phrase "UAV arriving for item ABC123"). In this situation, the computing system could generate such dynamic audible alerts using currently known and/or future-developed text-to-speech techniques, among other options.

In yet another case, the computing system may output the indication by transmitting the indication to another device associated with the source location. For example, the other device may be a mobile device that an employee at a business could refer to. Moreover, the indication transmitted to the other device could be a text message, a notification for a software application installed at the mobile device, and/or a phone call placed to the mobile device, among others. In this way, an individual, such as the employee, could be made aware of arrival of the UAV even if the individual is not currently viewing the graphical interface being displayed at the computing system. Other cases and examples are also possible.

G. Sub-Location Indication

When the assigned UAV has arrived or is about to arrive at the source location, the computing system may receive a sub-location notification indicating a sub-location of the source location (e.g., a pickup location within the source location) at which the assigned UAV has arrived or is about to arrive. As with a flight-status notification and an arrival notification, the computing system may receive the sub-location notification from the server, from the assigned UAV, and/or from other UAVs, among other options. Moreover, the sub-location notification could be part of an arrival notification or could be separate from an arrival notification.

In either case, the entity (e.g., server) transmitting the sub-location notification could determine in various ways the particular sub-location at which the assigned UAV should pick up the item. For example, account information (e.g., stored in user-account database 316) associated with the computing system may include information specifying one or more sub-locations within the source location. Thus, the server could refer to that account information to determine candidate sub-locations at which the assigned UAV could arrive to pick up the item. And the server could then select the particular sub-location from among the candidates based on various factors, such as based on there being no other UAV that has been selected to arrive at the particular sub-location during the ETA of the assigned UAV, for instance. Other examples are also possible.

In other cases, however, the sub-location may not be predefined and could be any location within or in the vicinity of the source location at which the assigned UAV could feasibly land and/or hover over upon arrival. In such cases, the entity may determine the sub-location at which the UAV arrived or is about to arrive based on location information received from a location determination platform (e.g., Global Positioning System (GPS), Global Navigation Satellite System (GLONASS), and/or BeiDou Navigation Satellite System), among other options. Other cases are also possible.

In-line with state 814 of FIG. 8, when the computing system receives a sub-location notification, the computing system may responsively output an indication of the sub-location at which the assigned UAV has arrived or is about to arrive.

In one case, the computing system may output the indication by using the received sub-location notification as basis for displaying, on the graphical interface, a graphical status indicating the sub-location. Generally, this graphical status could take the form of letters and/or numbers displayed substantially alongside the graphical identifier of the item and/or the graphical identifier of the assigned UAV, so as to indicate the sub-location at which the UAV assigned to that item has arrived or is about to arrive. The graphical status could take on other forms as well.

Figure 9J:
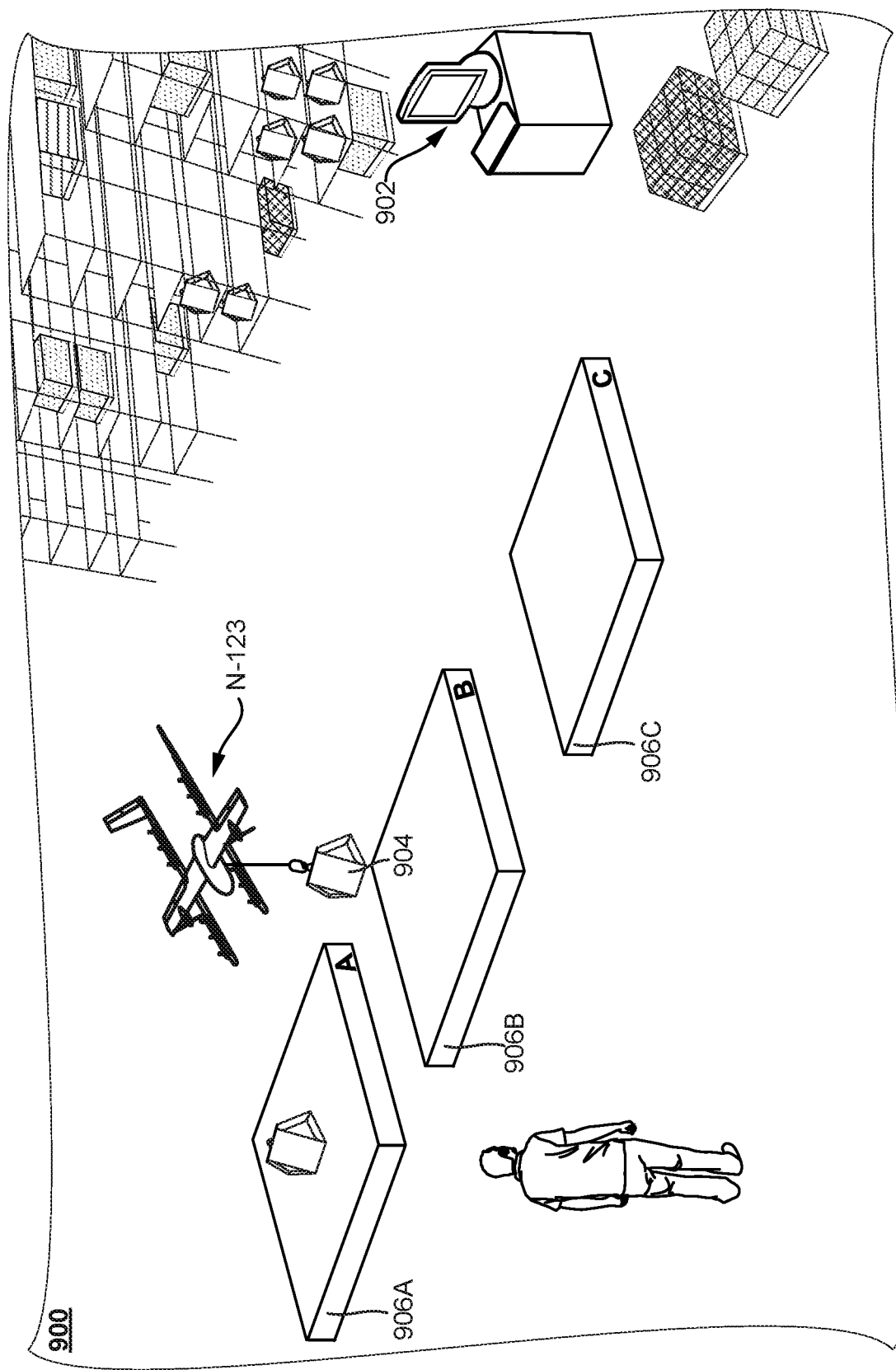

Referring again to FIG. 9I, screen state 932 shows that the interface feature 922 has been updated to indicate that the assigned UAV N-123 is arriving at "platform B" of the source location. As such, FIG. 9J then illustrates arrival of the assigned UAV N-123 at the sub-location 906B corresponding to platform B in the source location 900. Moreover, FIG. 9J illustrates that the item 904 has been loaded onto a pickup apparatus of the assigned UAV N-123 and thus that the UAV N-123 is picking up the item. Other illustrations are possible well.

In another case, the computing system may output the indication by causing an audio output device to output an audible alert indicating the sub-location. For example, the audible alert could be a pre-recorded alert indicating the sub-location (e.g., outputting of the phrase "UAV arriving at platform B"). Other examples are also possible.

In yet another case, the computing system may output the indication by transmitting the indication to another device associated with the source location. For example, here again, the other device may be a mobile device that an employee at a business could refer to. In this way, an individual, such as the employee, could be made aware of a sub-location of the arriving UAV even if the individual is not currently viewing the graphical interface being displayed at the computing system. Other cases and examples are also possible.

In a further aspect, when the computing system outputs an indication of the sub-location, the indication may include directions or other guidance to the sub-location, which could assist with locating of the assigned UAV when there are numerous possible sub-locations and/or when such sub-locations are not predefined. Generally, the computing system may output the directions in various ways. For example, the directions could take the form of an arrow being displayed by the computing system, with that arrow pointing in the direction of the sub-location for instance. In another example, the directions could take the form of step-by-step navigation to the sub-location, with the step-by step navigation being displayed by the computing device and/or being outputted as audible navigation by an audio output device, among other options. Moreover, the computing system may determine or otherwise facilitate in various ways the directions to the sub-location.

In one case, the computing system may have stored thereon or otherwise have access to mapping data that maps predefined directions respectively to each sub-location. With this arrangement, when the computing system determines a sub-location at which the assigned UAV has arrived or is about to arrive, the computing system may refer to the mapping data to determine the predefined directions that correspond to the determined sub-location. And the computing system may then output the predefined directions.

In another case, the computing system may facilitate the directions based on information from currently known and/or future developed navigation system(s). In particular, the computing system may provide a navigation system with the computing system's current location and with the sub-location as well as a request for directions from the current location to the sub-location. And the computing system may then receive from the navigation system the directions that are based on the provided locations. In this case, the computing system may additionally or alternatively provide these directions to another device associated with the source location, so that the other device could output these directions. Furthermore, the computing system may additionally or alternatively provide the other device with information about the sub-location, so that the other device could then similarly communicate with a navigation system to receive directions from the device's current location to the sub-location.

In yet another case, the computing system may facilitate the directions through establishment of a local connection with the assigned UAV. In particular, the computing system may use currently known or future developed communication techniques to establish a local connection with the assigned UAV through the computing system's and the assigned UAV's respective communication interfaces. Once established, the computing system may use communication signals from the UAV as basis for determining the sub-location at which the UAV arrived or is about to arrive. By way of example, the computing system may determine signal strength of the signals, and based on the determined signal strength, the computing system may determine the directions to the sub-location. For instance, as the determined signal strength increases, the computing system may determine that a distance to the sub-location is decreasing and may provide a graphical or audible indication of that determination, and vice versa. Furthermore, in this case, the computing system could additionally or alternatively facilitate local connection establishment between the assigned UAV and another device associated with the source location, so that the other device can output directions to the sub-location. Other cases are possible as well.

H. Successful Versus Unsuccessful Pickup

Once the assigned UAV is at the source location, the UAV may then pick up the item that the UAV has been assigned to pick based on the UAV-assignment request. Generally, the UAV may automatically pick up the item using a payload system as described above. In doing so, the UAV may establish a physical connection with the item, such as through the payload coupling apparatus for instance, and may then lift the item, such as by using the tether for instance. In some situations, however, an individual may establish the physical connection between the UAV and the item. Other situations are possible as well.

When the assigned UAV picks up the item at the source location, the pickup of the item may be successful or may be unsuccessful. Generally, a successful versus unsuccessful pickup may be determined based the UAV's physical capabilities with respect to the item. For example, a pickup could be considered to be successful if the UAV was capable of maintaining a physical connection with the item (e.g., without the item being dropped) and/or if the UAV was capable of lifting off with the item for subsequent transport of the item. Whereas, a pickup could be considered to be unsuccessful if the UAV was not capable of maintaining a physical connection with the item (e.g., the item was dropped) and/or if the UAV was not capable of lifting off with the item for subsequent transport of the item.

Additionally or alternatively, a successful versus unsuccessful pickup may be determined based an item being placed on a UAV in accordance with a corresponding UAV assignment. For example, a pickup could be considered to be successful if the item at issue is picked up by or otherwise loaded onto the UAV that has been assigned to pick up that item in accordance with the UAV assignment for the item. Whereas, a pickup could be considered to be unsuccessful if the item at issue is picked up by or otherwise loaded onto a UAV other than the UAV that has been assigned to pick up that item and/or if the UAV assigned to pick up a particular item has picked up or otherwise had loaded thereon an item other than the one that the UAV has been assigned to pick up. Other approaches for evaluating a successful versus unsuccessful pickup are possible as well.

Given this, the computing system may receive a successful pickup notification or may receive an unsuccessful pickup notification. A successful pickup notification may indicate that the assigned UAV successfully picked up the item at the source location for subsequent transport of the item to another location. Whereas, an unsuccessful pickup notification may indicate that the assigned UAV did not successfully pick up the item at the source location for subsequent transport of the item to another location. Nonetheless, the computing system may receive such notification in various ways.

In one case, the computing system may receive successful and/or unsuccessful pickup notifications from the assigned UAV. In particular, the UAV may determine whether or not a pickup is successful or unsuccessful, and may then transmit a notification to the computing system (e.g., directly or via the server) based on that determination. In this case, the UAV may determine in various ways whether or not a pickup is successful or unsuccessful.

For example, the UAV may determine whether or not an item picked up by or otherwise loaded onto the UAV is the item that the UAV has been assigned to pick up. To do so, the UAV may initially obtain an identifier of the item that the UAV has been assigned to pick up. Also, the UAV may determine an identifier of the item that has been picked up by or otherwise loaded onto the UAV, such as through scanning of a label that has an identifier of the item encoded thereon and that is affixed to the item. And the UAV may then determine whether or not the determined identifier of the item that has been picked up by or otherwise loaded onto the UAV matches the obtained identifier of the item that the UAV has been assigned to pick up. If the identifiers do match, the UAV may responsively determine a successful pickup. But if the identifiers do not match the UAV may responsively determine an unsuccessful pickup.

In another example, the UAV may determine whether or not was capable of maintaining a physical connection with the item. For instance, the UAV may do so based on sensor data from a touch sensor and/or a proximity sensor that indicates whether or not the item is in contact with and/or proximate to the UAV. Nonetheless, if the UAV determines that the UAV was capable of maintaining a physical connection with the item, then the UAV may responsively determine a successful pickup. But if the UAV determines that the UAV was not capable of maintaining a physical connection with the item, then the UAV may responsively determine an unsuccessful pickup.

In yet another example, the UAV may determine whether or not the UAV was able to lift off with the item. For instance, the UAV may do so based on sensor data from an altitude sensor. In this instance, if the sensor data indicates that the UAV's altitude is above a threshold while the item is physically connected to the UAV, the UAV may determine that the UAV was able to lift off with the item. But if the UAV determines that the UAV is not able to reach at least the threshold altitude while the item is physically connected to the UAV, the UAV may determine that the UAV is not able to lift off with the item. Nonetheless, if the UAV determines that the UAV is able to lift off with the item, then the UAV may responsively determine a successful pickup. But if the UAV determines that the UAV is not able to lift off with the item, then the UAV may responsively determine an unsuccessful pickup. Other examples are also possible.

In another case, the computing system may receive successful and/or unsuccessful pickup notifications from another device capable of identifying a UAV. In particular, when the item at issue is getting picked up by or otherwise being loaded onto a UAV, the other device may identify that UAV and may provide the computing system with an identifier of that UAV. For example, an individual may use a scanner device to scan a label that is affixed to the UAV and has the UAV's identifier encoded thereon, and the scanner device may provide that identifier to the computing system. Given the UAV's identifier, the computing system may then determine whether this identifier matches an identifier of the UAV that has been assigned to pick up the item. If the identifiers do match, the computing system may determine a successful pickup. But if the identifiers do not match the computing system may responsively determine an unsuccessful pickup. In this way, a UAV identifier received from the other device may correspond to a successful or an unsuccessful pickup notification.

In yet another case, the computing system may receive successful and/or unsuccessful pickup notifications via an IME of the computing system, such as through user-input provided by an individual. For example, the computing system may display, on the graphical interface, a first interface feature that is selectable to indicate a successful pickup with regards to a particular UAV assignment as well as a second interface feature that is selectable to indicate an unsuccessful pickup with regards to the particular UAV assignment. With this arrangement, the computing system may receive via an IME input data indicative a selection of the first interface feature and thus of an indication of a successful pickup with regards to the UAV assignment at issue. Alternatively, the computing system may receive via the IME input data indicative a selection of the second interface feature and thus of an indication of an unsuccessful pickup with regards to the UAV assignment at issue. Other cases are also possible.

Figure 9K:
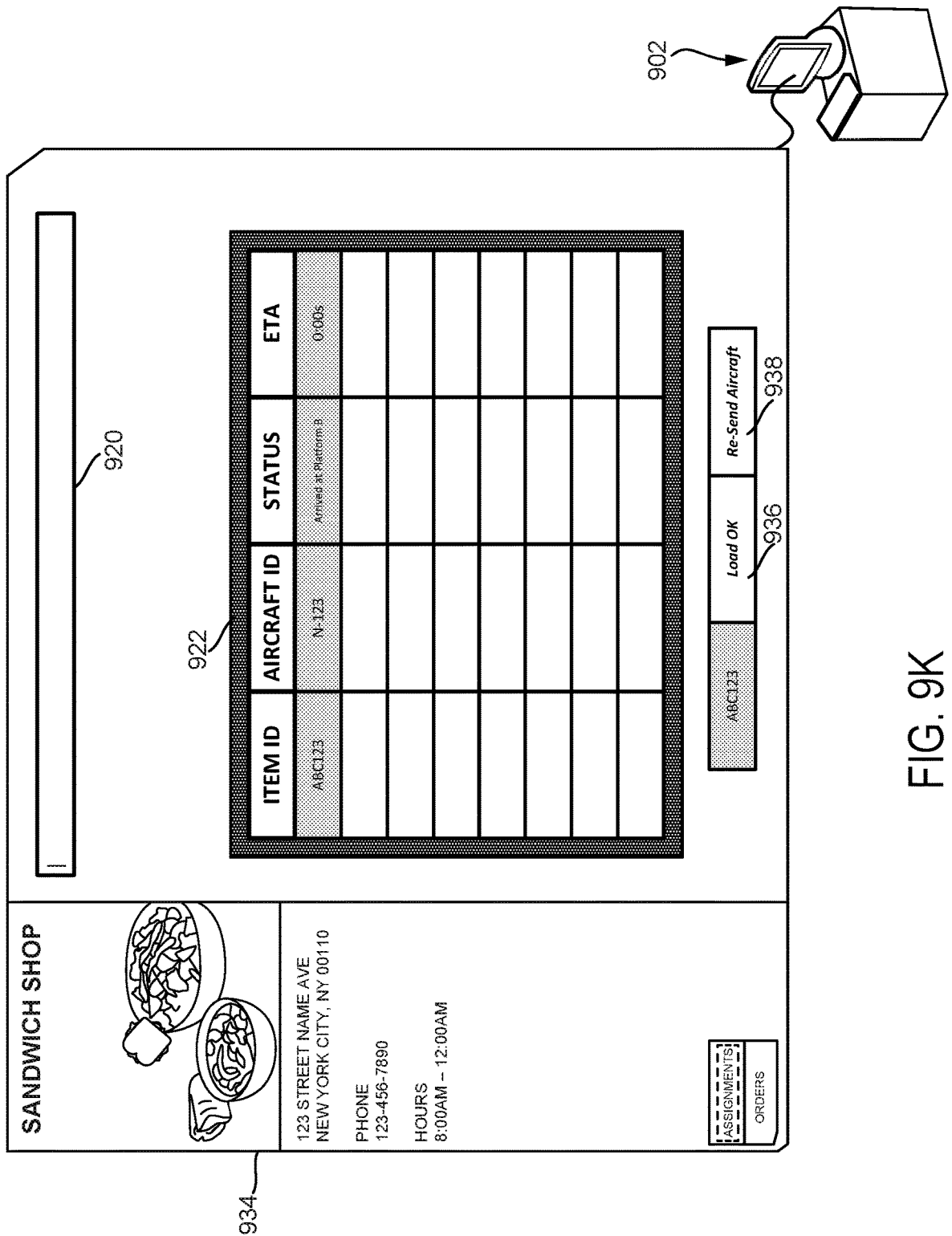

FIG. 9K illustrates yet another example screen state 934 of the graphical interface displayed by the computing system 902. Specifically, screen state 934 shows interface features 936 and 938 that are selectable to indicate a successful or unsuccessful pickup with regards to the UAV assignment for item 904. In particular, interface feature 936 (e.g., "Load OK") corresponds to a successful pickup and thus selection of that interface feature 936 would cause the computing system 902 to receive a successful pickup notification indicating a successful pick up of the item 904. Whereas, interface feature 938 (e.g., "re-send aircraft") corresponds to an unsuccessful pickup and thus selection of that interface feature 938 would cause the computing system 902 to receive an unsuccessful pickup notification indicating an unsuccessful pick up of the item 904. Other illustrations are possible as well.

In-line with state 816 of FIG. 8, when the computing system receives an unsuccessful pickup notification, the computing system may responsively display, on the graphical interface, a graphical status indicating that the UAV did not successfully pick up the item at issue. In practice, the computing system may display this state substantially alongside the graphical identifier of the item and/or the graphical identifier of the assigned UAV, so as to indicate that the graphical status is with regards to a particular UAV assignment. Moreover, the graphical status indicative of the unsuccessfully pickup could represent various types of information.

For example, the graphical status could simply indicate that the item was not successfully pickup (e.g., display "unsuccessful pickup"). In another example, the graphical status may additionally or alternatively indicate the reason for the unsuccessful pickup. For instance, the graphical status may indicate that the item was picked up by other otherwise loaded onto a UAV other than the UAV that has been assigned to pick up that item and/or that the UAV assigned to pick up the item has picked up or otherwise had loaded thereon an item other than the one that the UAV has been assigned to pick up. In another instance, the graphical status may indicate that the UAV was not able to maintain a physical connection with the item (e.g., display "item has been dropped by the UAV") and/or that the UAV was not able to lift off with the item (e.g., display "UAV unable to lift off"). In yet another example, the graphical status may indicate that a new UAV-assignment request is being facilitated for the item, thereby indicating that pick up of the item was unsuccessful. Other examples are possible as well.

Additionally or alternatively, also in-line with the state diagram 800 of FIG. 8, when the computing system receives an unsuccessful pickup notification, the computing system may responsively facilitate a new UAV-assignment request for the item and do so as described herein, thereby possibly triggering a sequence of operations that is the same or similar to those described above. In this way, once a new UAV is assigned based on the new UAV-assignment request, the computing system may receive a new message indicating the new UAV that has been assigned to the item at issue, and so on.

Figure 9L:
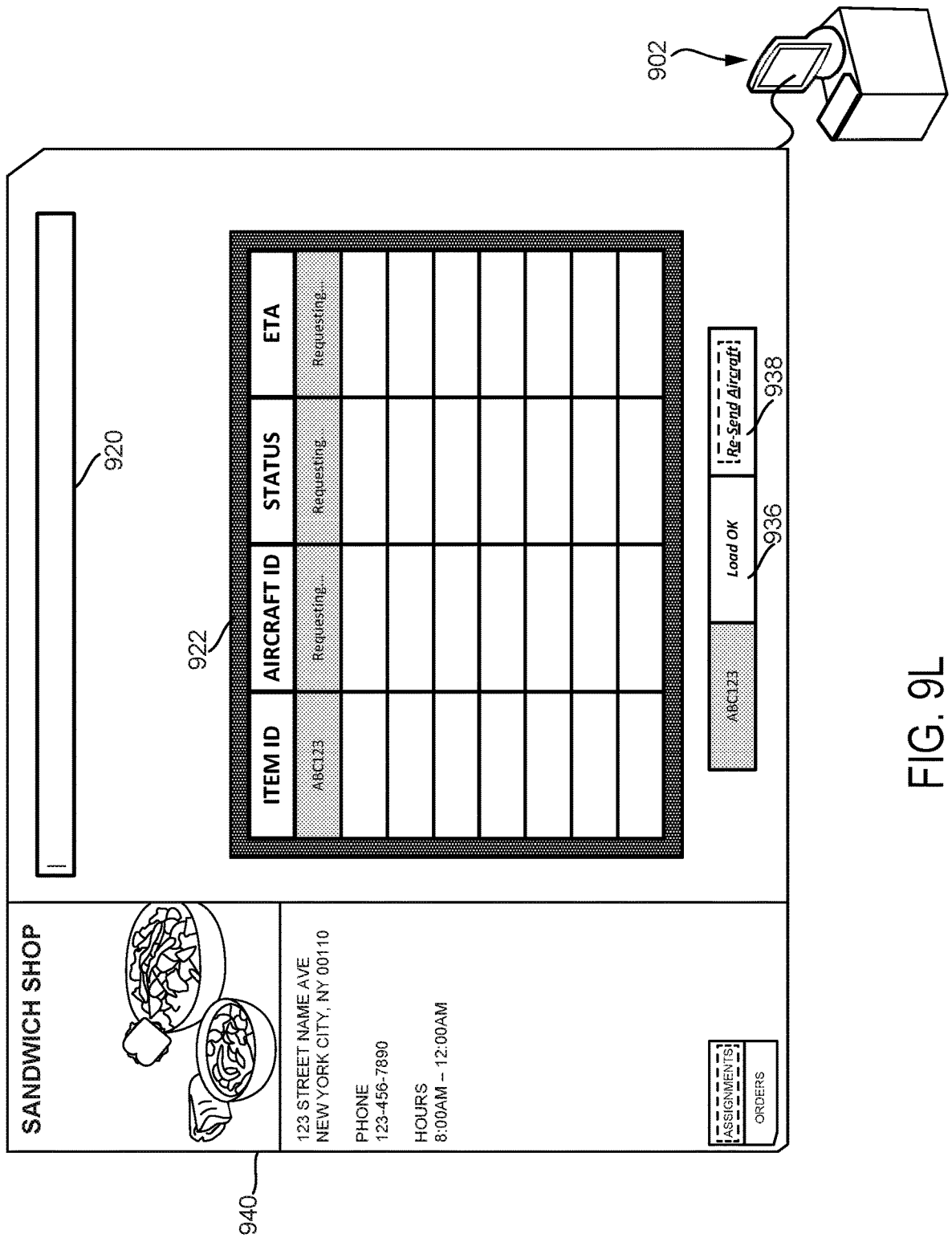

FIG. 9L illustrates yet another example screen state 940 of the graphical interface displayed by the computing system 902. Specifically, screen state 940 shows interface feature 938 has been selected and that, responsive to the selection, interface feature 922 has been updated to indicate that a new UAV-assignment request for item 904 is being facilitated (i.e., "requesting") and thus that a new UAV has not yet been assigned to pick up the item 904 at the source location. Other illustrations are possible as well.

In-line with state 818 of FIG. 8, when the computing system receives a successful pickup notification, the computing system may responsively display, on the graphical interface, a graphical status indicating that the UAV successfully picked up the item at issue. In practice, the computing system may display this state substantially alongside the graphical identifier of the item and/or the graphical identifier of the assigned UAV, so as to indicate that the graphical status is with regards to a particular UAV assignment. Moreover, the graphical status indicative of the unsuccessfully pickup could represent various types of information.

For example, the graphical status could simply indicate that the item was successfully picked up (e.g., display "complete"). In another example, the graphical status may additionally or alternatively indicate the reason for the successful pickup. For instance, the graphical status may indicate that the item was picked up by or otherwise loaded onto the correct UAV that has been assigned to pick up that item. In another instance, the graphical status may indicate that the UAV was able to maintain a physical connection with the item and/or that the UAV was able to lift off with the item. Other examples are possible as well.

Figure 9M:
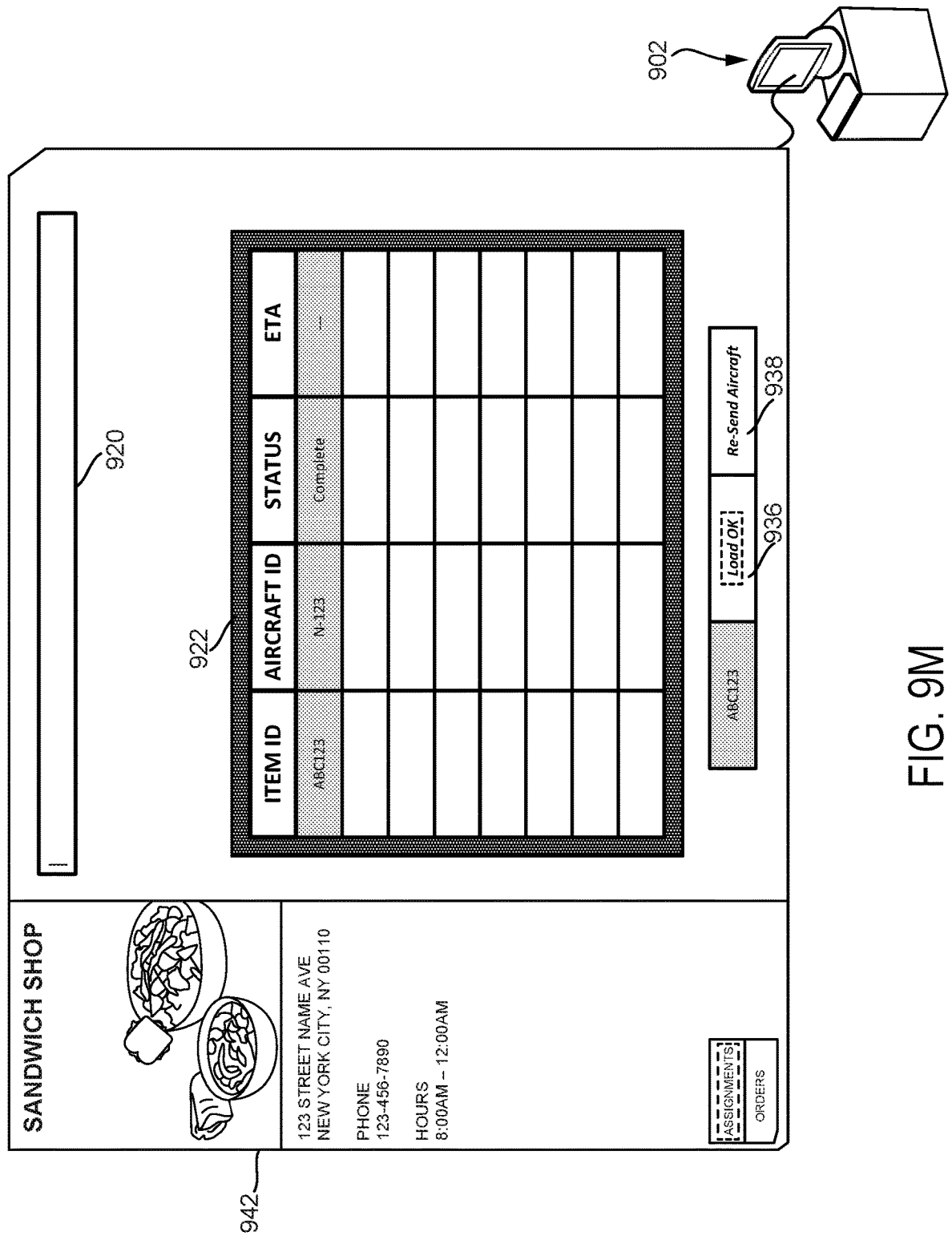

FIG. 9M illustrates yet another example screen state 942 of the graphical interface displayed by the computing system 902. Specifically, screen state 942 shows interface feature 936 has been selected and that, responsive to the selection, interface feature 922 has been updated to indicate that pickup of the item 904 by the assigned UAV N-123 is successful (e.g., graphical status indicating "complete"). Other illustrations are possible as well.

Additionally or alternatively, in-line with state 820 of FIG. 8, when the computing system receives a successful pickup notification, the computing system may responsively facilitate transmission of an indication that the item has been picked up, with that transmission being to a device associated with the location to which the item is being transported after the pickup. For example, the device may be the device that initiated the transport request for the item as discussed above, or may be another device. Furthermore, the indication transmitted to the device could be a text message, a notification for a software application installed at the device, and/or a phone call placed to the device, among other options. Moreover, when facilitating transmission of the indication, the computing system may transmit the indication to the device. In another implementation, however, the computing system may transmit the successful pickup notification to the server, so that the server could then responsively communicate the indication to the device. Other implementations are also possible.

Figure 9N:
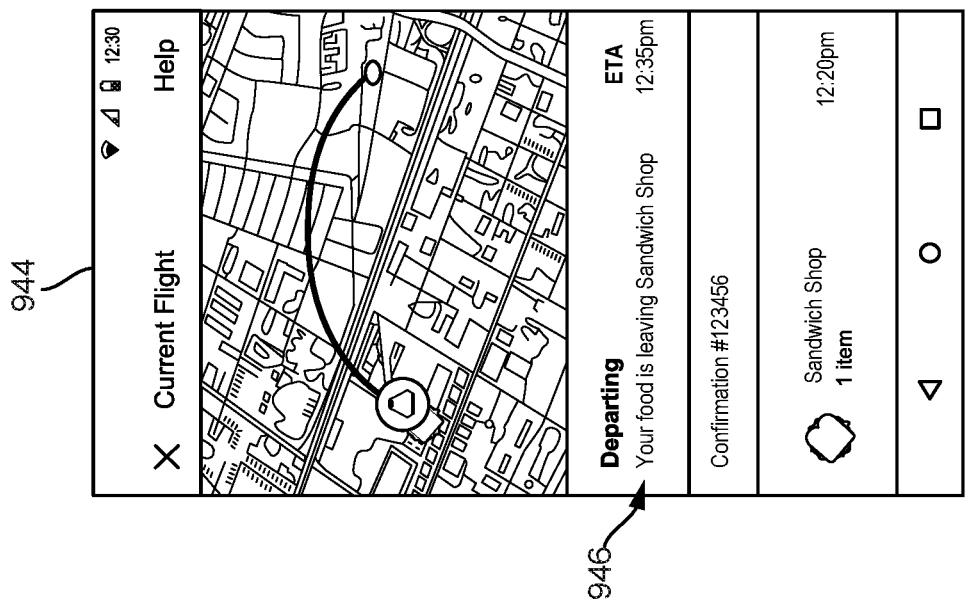
Figure 90:
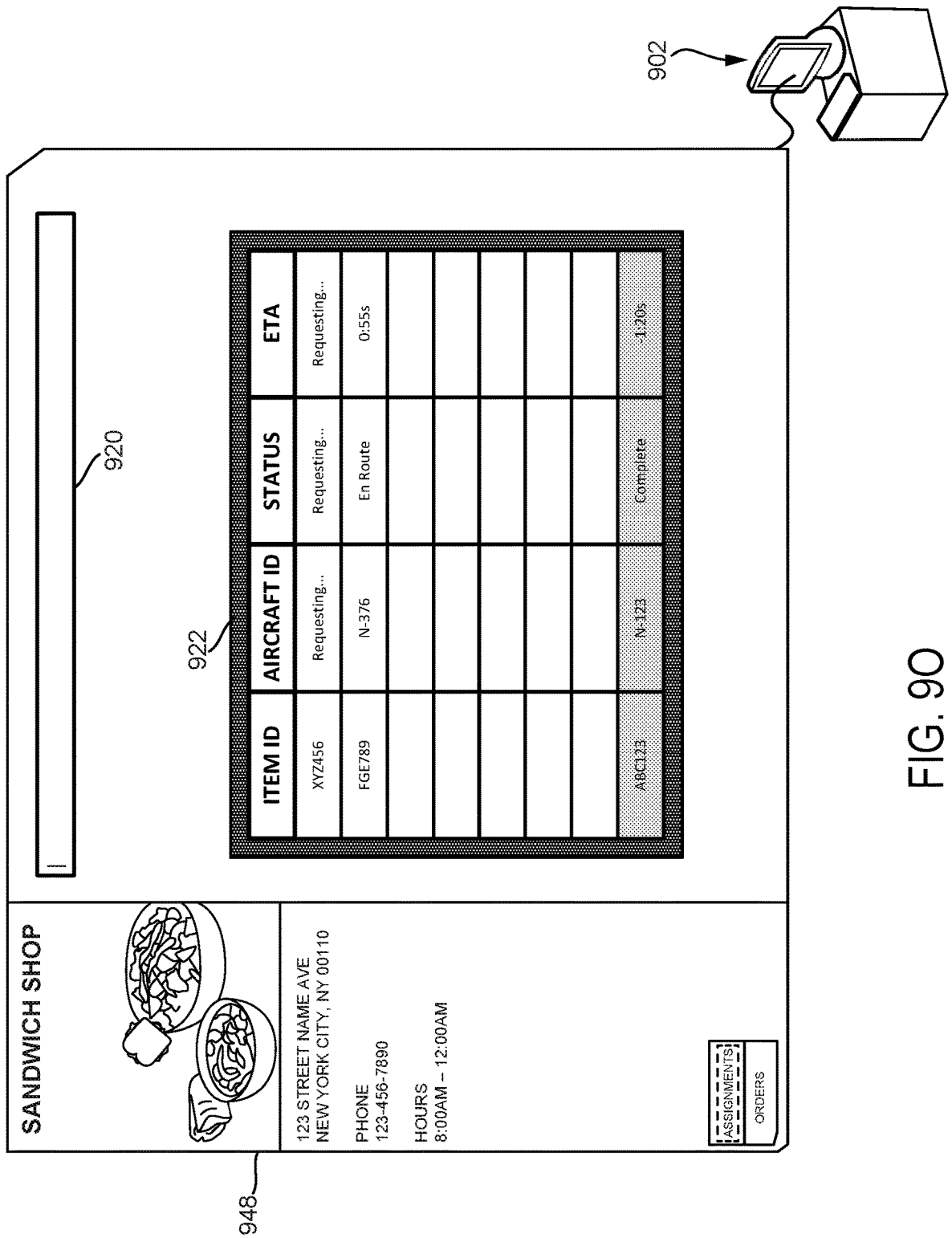

FIG. 9N illustrates example screen 944 that could be displayed on a customer's mobile device, so that the customer could be notified that the item has been picked up following the customer's transport request. As shown, the screen 944 includes a notification 946 indicating that the item (e.g., "food") is departing from the source location (e.g., "sandwich shop") and also indicating an ETA of the item at the target location that was originally specified in the transport request. Other illustrations are also possible.

I. Multiple UAV Assignments

In a further aspect, the computing system may be configured to display, on the graphical interface, information related to two or more UAV assignments. For example, for a first UAV-assignment, the computing system may display any graphical status and/or identifiers described herein, such as a graphical identifier of a first assigned UAV, a graphical status indicating that the first UAV-assignment request is being facilitated, or a graphical status indicating the status of flight of a first assigned UAV, among other options. While the computing system is displaying information for the first UAV assignment, the computing system could concurrently display for at least a second UAV assignment any graphical status and/or identifiers described herein, such as a graphical identifier of a second assigned UAV, among other options.

In this regard, the computing system may display information on the graphical interface based on separate message and/or notification respectively received for various UAV assignments. For example, the computing system may receive a first message including a first UAV identifier that identifies a first UAV assigned to a first item based on a first UAV-assignment request. The computing system may then use the received first UAV identifier as basis for displaying a graphical identifier of the first UAV and a graphical identifier of the first item. Additionally, the computing system may receive a second message including a second UAV identifier that identifies a second UAV assigned to a second item based on a second UAV-assignment request. The computing system may then use the received second UAV identifier as basis for displaying a graphical identifier of the second UAV and a graphical identifier of the second item. In this example, the graphical identifier of the first UAV, the graphical identifier of the first item, the graphical identifier of the second UAV, and the graphical identifier of the second item could all be display concurrently by the computing system.

Yet further, when displaying multiple UAV assignments concurrently, the computing system may display the UAV assignments so as to indicate which UAV is assigned to which item. For instance, a graphical identifier of a first UAV may be displayed substantially alongside a graphical identifier of a first item that the first UAV has been assigned to pick up and subsequently transport. Also, a graphical identifier of a second UAV may be displayed substantially alongside a graphical identifier of a second item that the second UAV has been assigned to pick up and subsequently transport. By way of example, the computing system may display the graphical identifier of the first UAV and the graphical identifier of the first item on a first row of an interface feature. And the computing system may display the graphical identifier of the second UAV and the graphical identifier of the second item on a second row of the interface feature (e.g., different from the first row). Other examples are also possible.

FIG. 9O illustrates yet another example screen state 948 of the graphical interface displayed by the computing system 902. Specifically, screen state 948 illustrates that interface feature 922 has been updated to indicate multiple UAV assignments and UAV-assignment requests. In particular, interface feature 922 indicates that the above-described assignment of UAV N-123 to item 904 has been completed. Additionally, interface feature 922 indicates that a UAV identified as "N-376" has been assigned to pick up an item identified as "FGE789", that the UAV N-376 is en route to the source location, and that an ETA of the UAV N-376 is in "55 seconds". Moreover, the interface feature indicates that a UAV-assignment request has been submitted for an item identified as "XYZ456" and that a UAV has not yet been assigned to pick up this item. Other illustrations are possible as well.

Figure 9P:
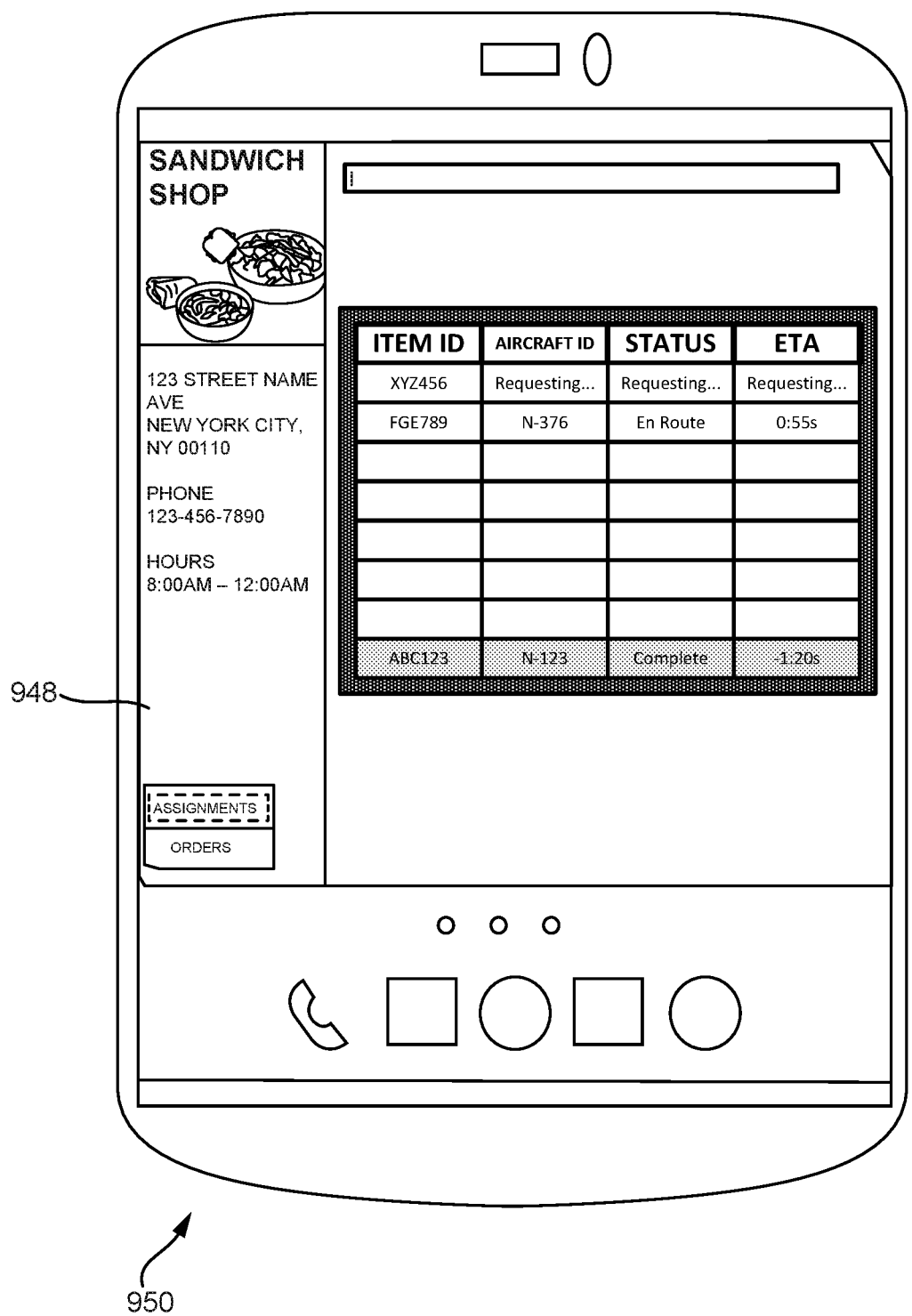

In a further aspect, please note that any one of the interfaces shown in the figures could be adapted for a mobile phone, tablet, and/or for any other device. By way of example, FIG. 9P shows the same screen state 948 of the graphical interface as in FIG. 9O, except formatted for a tablet 950. Other examples are also possible.

VIII. Example Computing System

Figure 10:
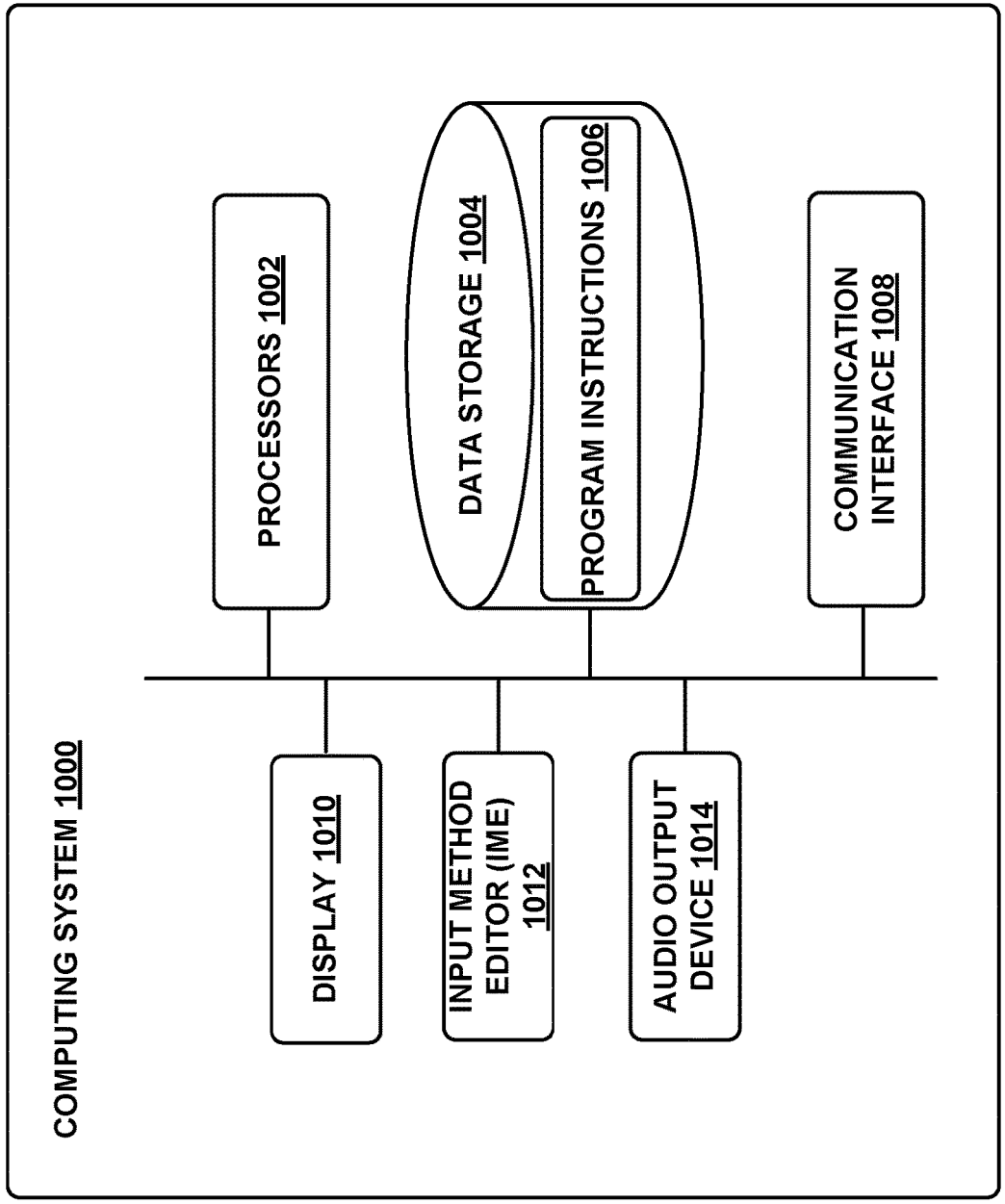
FIG. 10 illustrates a schematic diagram of a computing system, according to an example implementation.

FIG. 10 is a block diagram showing components of an example computing system 1000. Generally, the computing system 1000 may take the form of a desktop computer, a laptop, a tablet, a wearable computing device, and/or a mobile phone, among other possibilities. Nonetheless, as shown, the computing system 1000 may include one or more processors 1002, data storage 204, program instructions 1006, communication interface 1008, display 1010, Input Method Editor (IME) 1012, and audio output device 1014. Note that the computing device 1000 is shown for illustration purposes only and computing system 1000 may include additional components and/or have one or more components removed without departing from the scope of the disclosure. Further, note that the various components of computing device 1000 may be arranged and connected in any manner.

Processor(s) 1002 may be a general-purpose processor or a special purpose processor (e.g., digital signal processors, application specific integrated circuits, etc.). The processor(s) 1002 can be configured to execute computer-readable program instructions 1006 that are stored in the data storage 1004 and are executable to carry out various functions described herein, among others The data storage 1004 may include or take the form of one or more computer-readable storage media that can be read or accessed by processor(s) 1002. The one or more computer-readable storage media can include volatile and/or non-volatile storage components, such as optical, magnetic, organic or other memory or disc storage, which can be integrated in whole or in part with processor(s) 1002. In some implementations, the data storage 1004 can be implemented using a single physical device (e.g., one optical, magnetic, organic or other memory or disc storage unit), while in other implementations, the data storage 1004 can be implemented using two or more physical devices. Further, in addition to the computer-readable program instructions 1006, the data storage 1004 may include additional data such as diagnostic data, among other possibilities.

The communication interface 1008 may allow computing system 1000 to communicate, using analog or digital modulation, with other devices, servers, access networks, and/or transport networks. Thus, communication interface 1008 may facilitate circuit-switched and/or packet-switched communication, such as plain old telephone service (POTS) communication and/or Internet protocol (IP) or other packetized communication. For instance, communication interface 1008 may include a chipset and antenna arranged for wireless communication with a radio access network or an access point. Also, communication interface 1008 may take the form of or include a wireline interface, such as an Ethernet, Universal Serial Bus (USB), or High-Definition Multimedia Interface (HDMI) port. Communication interface 1008 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 1008. Furthermore, communication interface 1008 may comprise multiple physical communication interfaces (e.g., a Wifi interface, a BLUETOOTH® interface, and a wide-area wireless interface).

Display 1010 may take on any form (e.g., LED, LCD, OLED, etc.). Further, display 1010 may be a touchscreen display (e.g., a touchscreen display on a tablet). Display 1010 may show a graphical user interface (GUI) that may provide an application through which a user may interact with the systems disclosed herein.

Further, the computing system 1000 may receive user input (e.g., from the user of the computing system 1000) via IME 1012. In particular, the IME 1012 may allow for interaction with the GUI such as for scrolling, providing text, and/or selecting various features of the application, among other possible interactions. The IME 1012 may take on various forms. In one example, the IME 1012 may be a pointing device such as a computing mouse used for control of the GUI. However, if display 1010 is a touchscreen display, user touch input can be received (e.g., such as using a finger or a stylus) that allows for control of the GUI. In another example, IME 1012 may be a text IME such as a keyboard that provides for selection of numbers, characters and/or symbols to be displayed via the GUI. For instance, in the arrangement where display 1010 is a touchscreen display, portions of the display 1010 may show the IME 1012. Thus, touch-input on the portion of the display 1010 including the IME 1012 may result in user-input such as selection of specific numbers, characters, and/or symbols to be shown on the GUI via display 1010. In yet another example, the IME 1012 may be a voice IME that may be used that receives audio input, such as from a user via a microphone (not shown) of the computing system 1000, that is then interpretable using one of various speech recognition techniques into one or more characters than may be shown via display 1010. Other examples may also be possible.

Yet further, audio output device 1014 may include one or more devices configured to convert electrical signals into audible signals (e.g., sound pressure waves). As such, the audio output device 1014 may take the form of headphones (e.g., over-the-ear headphones, on-ear headphones, ear buds, wired and wireless headphones, etc.), one or more loudspeakers, or an interface to such an audio output device (e.g., a ¼" or ⅛" tip-ring-sleeve (TRS) port, a USB port, etc.). In some implementations, the audio output device 1014 may include an amplifier, a communication interface (e.g., BLUETOOTH interface), and/or a headphone jack or speaker output terminals. Other systems or devices configured to deliver perceivable audio signals to a user are possible.

IX. Example Server

Figure 11:
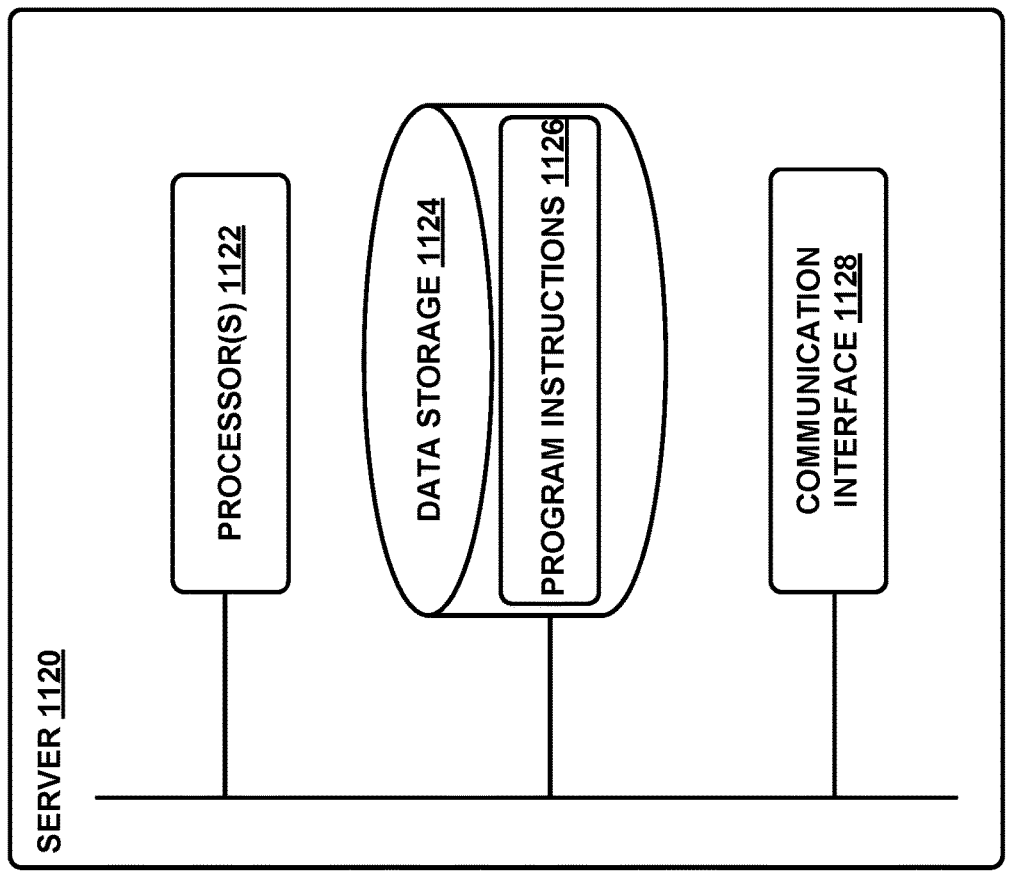
FIG. 11 illustrates a schematic diagram of a server, according to an example implementation.

FIG. 11 illustrates a schematic diagram of a server 1120, according to an example implementation. The server 1120 includes one or more processor(s) 1122 and data storage 1124, such as a non-transitory computer readable medium. Additionally, the data storage 1124 is shown as storing program instruction 1126, which may be executable by the processor(s) 1122. Further, the server 1120 also includes a communication interface 1128. Note that the various components of server 1120 may be arranged and connected in any manner.

Moreover, the above description of processor(s) 1022, data storage 1004, and communication interface 1008, may apply to any discussion relating to the respective component being used in another system or arrangements. For instance, as noted, FIG. 11 illustrates processors, data storage, and a communication interface as being incorporated in another arrangement. These components at issue may thus take on the same or similar characteristics (and/or form) as the respective components discussed above in association with FIG. 10. However, the components at issue could also take on other characteristics (and/or form) without departing from the scope of the disclosure.

In practice, a server may be any program and/or device that provides functionality for other programs and/or devices (e.g., any of the above-described devices), which could be referred to as "clients". Generally, this arrangement may be referred to as a client-server model. With this arrangement, a server can provides various services, such as data and/or resource sharing with a client and/or carrying out computations for a client, among others. Moreover, a single server can provide services for one or more clients and a single client can receive services from one or more servers. As such, servers could take various forms (currently known or developed in the future), such as a database server, a file server, a web server, and/or an application server, among other possibilities.

Generally, a client and a server may interact with one another in various ways. In particular, a client may send a request or an instruction or the like to the server. Based on that request or instruction, the server may perform one or more operations and may then respond to the client with a result or with an acknowledgement or the like. In some cases, a server may send a request or an instruction or the like to the client. Based on that request or instruction, the client may perform one or more operations and may then respond to the server with a result or with an acknowledgement or the like. In either case, such communications between a client and a server may occur via a wired connection or via a wireless connection, such as via a network for instance.

X. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Further, in the context of the present disclosure, data could be treated to ensure privacy when the data might include (without limitation) information related to: an individual's identity, and individual's location, an individual's order history, a UAV's identity, a UAV's location, a UAV's flight history, a business's identity, a business's location, and/or a business's order history, among others.

Accordingly, in situations in which system(s) collect and/or make use of information about entities (e.g., individuals, UAVs, and/or businesses), data may be treated in one or more ways before it is stored or used, so that personally identifiable information is removed or otherwise cannot be discovered by an unauthorized entity/system.

In one example, an entity's identity and/or geographic location may be treated so that no personally identifiable information can be determined for the entity. To do so, a system may transmit and/or receive data in the form of anonymized data streams. That is, data representing information related to one or more entities may not provide any information related to respective identities and/or locations of the one or more entities, thereby maintaining privacy.

In another example, when data is set to include information related to an entity's identity and/or location, the data could be arranged so that this information is specified in such a way that only an authorized entity/system could ascertain a particular identify and/or a particular location of an entity. To do so, a system may transmit and/or receive data in the form of coded data streams in which the information takes the form a code interpretable only by an authorized entity/system.

In yet another example, data representing information related to an entity's identity and/or location may be encrypted so that only an authorized entity/system could obtain access to the information. For instance, an authorized entity/system could obtain access to the information only through use of a previously-obtained security key that enables access to the information.

In yet another example, data representing information related to an entity's identity and/or location may only be available temporarily. For instance, a system could be configured to store such data for a certain time period and to then permanently delete the data upon detecting expiration of this time period. Other examples are possible as well.

We claim:

1. A method comprising:
   displaying, by a computing system, a graphical interface that indicates unmanned aerial vehicle (UAV) assignments for a plurality of UAVs;

receiving, by the computing system from a server, a plurality of messages, wherein each message of the plurality of messages comprises a UAV identifier that identifies, from the plurality of UAVs, a respective UAV assigned to a respective item based on a respective UAV-assignment request for the respective item, wherein the respective UAV-assignment request comprises a request to have a UAV assigned to pick up the respective item at a source location for subsequent transport of the respective item from the source location to another location; and based on the plurality of messages, displaying, on the graphical interface, for at least two of the plurality of UAVs, a graphical identifier of the respective UAV assigned to the respective item based on the respective UAV-assignment request for the respective item alongside a graphical identifier of the respective item to facilitate loading of the respective item onto the respective UAV.

2. The method of claim 1, further comprising:
receiving, by the computing system, a particular UAV-assignment request for a particular item; and
in response to receiving the particular UAV-assignment request, transmitting, by the computing system, the particular UAV-assignment request to the server, wherein the server coordinates UAV assignments, and
wherein receiving the plurality of messages comprises receiving a message from the server in response to transmitting the particular UAV-assignment request to the server.

3. The method of claim 1,
wherein a particular UAV-assignment request is based on a transport request requesting to have a particular item transported from the source location to another location,
wherein the source location is associated with the computing system displaying the graphical interface,
wherein the transport request is received at the server,
wherein the server coordinates UAV assignments, and
wherein receiving the plurality of messages comprises receiving a message from the server based on the computing system being associated with the source location.

4. The method of claim 1, wherein each message further comprises a respective item identifier of the respective item, thereby indicating that the UAV identifier identifies the respective UAV from the plurality of UAVs assigned to the respective item based on the UAV-assignment request for the respective item.

5. The method of claim 1, wherein each UAV-assignment request includes a weight of the respective item, and wherein the respective UAV from the plurality of UAVs is assigned based at least on the weight of the respective item.

6. The method of claim 1, further comprising:
receiving, by the computing system, a flight-status notification indicating a status of flight by a particular UAV from the plurality of UAVs to the source location for pickup of a particular item; and
using the received flight-status notification as a basis for displaying, on the graphical interface, a graphical status indicating the status of flight by the particular UAV to the source location for pickup of the particular item.

7. The method of claim 6, wherein the flight-status notification indicating the status of flight by the particular UAV from the plurality of UAVs to the source location for pickup of the particular item comprises the flight-status notification indicating one or more of the following: (i) that the particular UAV is waiting for takeoff to the source location, (ii) that the particular UAV is en route to the source location, or (iii) an estimated time-of-arrival of the particular UAV at the source location.

8. The method of claim 1, further comprising:
receiving, by the computing system, an indication that a weight of a particular item is higher than a threshold weight; and
in response to receiving the indication, displaying, on the graphical interface, a graphical status indicating that the weight is higher than the threshold weight, wherein the graphical status is a graphical prompt requesting an update to the weight of the particular item.

9. The method of claim 8, further comprising:
receiving, by the computing system, an update to a UAV-assignment request indicating an update to the weight of the particular item, wherein a particular UAV from the plurality of UAVs is assigned to the particular item based at least on the updated weight of the particular item.

10. The method of claim 1, further comprising:
receiving, by the computing system, an arrival notification indicating that a particular UAV from the plurality of UAVs has arrived or that arrival of the particular UAV is imminent at the source location; and
in response to receiving the arrival notification, outputting, by the computing system, an indication that the particular UAV has arrived or that arrival of the particular UAV is imminent at the source location.

11. The method of claim 10, wherein outputting the indication in response to receiving the arrival notification comprises:
using the received arrival notification as a basis for displaying, on the graphical interface, a graphical status indicating that the particular UAV has arrived or that arrival of the particular UAV is imminent at the source location.

12. The method of claim 10, wherein outputting the indication in response to receiving the arrival notification comprises:
causing an audio output device to output an audible alert indicating that the particular UAV has arrived or that arrival of the particular UAV is imminent at the source location.

13. The method of claim 1, further comprising:
receiving, by the computing system, a sub-location notification indicating a sub-location of the source location at which a particular UAV from the plurality of UAVs has arrived or at which arrival of the particular UAV is imminent; and
in response to receiving the sub-location notification, outputting, by the computing system, an indication of the sub-location at which the particular UAV has arrived or at which arrival of the particular UAV is imminent.

14. The method of claim 13, wherein outputting the indication in response to receiving the sub-location notification comprises:
using the received sub-location notification as a basis for displaying, on the graphical interface, a graphical status indicating the sub-location at which the particular UAV has arrived or at which arrival of the particular UAV is imminent.

15. The method of claim 13, wherein outputting the indication in response to receiving the sub-location notification comprises:

causing an audio output device to output an audible alert indicating the sub-location at which the particular UAV has arrived or at which arrival of the particular UAV is imminent.

16. The method of claim 13, wherein outputting the indication of the sub-location comprises outputting information indicating directions to the sub-location at which the particular UAV has arrived or at which arrival of the particular UAV is imminent.

17. The method of claim 1, further comprising:
receiving, by the computing system, a successful-pickup notification indicating that a particular UAV from the plurality of UAVs successfully picked up a particular item at the source location for subsequent transport of the particular item by the particular UAV to another location; and
using the received successful-pickup notification as a basis for displaying, on the graphical interface, a graphical status indicating that the particular UAV successfully picked up the particular item at the source location for subsequent transport of the particular item by the particular UAV to another location.

18. The method of claim 1, further comprising:
receiving, by the computing system, an unsuccessful-pickup notification indicating that a particular UAV from the plurality of UAVs did not successfully pick up a particular item at the source location for subsequent transport of the particular item by the particular UAV to another location; and
using the received unsuccessful-pickup notification as a basis for displaying, on the graphical interface, a graphical status indicating that the particular UAV did not successfully pick up the particular item at the source location for subsequent transport of the particular item by the particular UAV to another location.

19. An article of manufacture including a non-transitory computer-readable medium having stored thereon program instructions that, upon execution by a computing device remotely connected to a server, wherein the server is remotely connected to one or more unmanned aerial vehicles (UAVs), cause the computing device to perform operations comprising:
displaying a graphical interface that indicates unmanned aerial vehicle (UAV) assignments for a plurality of UAVs;
receiving, from a server, a plurality of messages, wherein each message of the plurality of messages comprises a UAV identifier that identifies, from the plurality of UAVs, a respective UAV assigned to a respective item based on a respective UAV-assignment request for the respective item, wherein the respective UAV-assignment request comprises a request to have a UAV assigned to pick up the respective item at a source location for subsequent transport of the respective item from the source location to another location; and
based on the plurality of messages, displaying, on the graphical interface, for at least two of the plurality of UAVs, a graphical identifier of the respective UAV assigned to the respective item based on the respective UAV-assignment request for the respective item alongside a graphical identifier of the respective item to facilitate loading of the respective item onto the respective UAV.

20. A computing device including a non-transitory computer-readable medium having stored thereon program instructions that, upon execution by the computing device, cause the computing device remotely connected a server, wherein the server is remotely connected to one or more unmanned aerial vehicles (UAVs) to perform operations comprising:
displaying a graphical interface that indicates unmanned aerial vehicle (UAV) assignments for a plurality of UAVs;
receiving, from a server, a plurality of messages, wherein each message of the plurality of messages comprises a UAV identifier that identifies, from the plurality of UAVs, a respective UAV assigned to a respective item based on a respective UAV-assignment request for the respective item, wherein the respective UAV-assignment request comprises a request to have a UAV assigned to pick up the respective item at a source location for subsequent transport of the respective item from the source location to another location; and
based on the plurality of messages, displaying, on the graphical interface, for at least two of the plurality of UAVs, a graphical identifier of the respective UAV assigned to the respective item based on the respective UAV-assignment request for the respective item alongside a graphical identifier of the respective item to facilitate loading of the respective item onto the respective UAV.

* * * * *